United States Patent
Carroll

(10) Patent No.: US 11,283,131 B1
(45) Date of Patent: Mar. 22, 2022

(54) MODULAR PORTABLE POWER SYSTEMS AND METHODS

(71) Applicant: Christopher Paul Carroll, Framingham, MA (US)

(72) Inventor: Christopher Paul Carroll, Framingham, MA (US)

(*) Notice: Subject to any disclaimer, the term of this patent is extended or adjusted under 35 U.S.C. 154(b) by 71 days.

(21) Appl. No.: 16/802,877

(22) Filed: Feb. 27, 2020

Related U.S. Application Data

(60) Provisional application No. 62/853,817, filed on May 29, 2019, provisional application No. 62/817,093, filed on Mar. 12, 2019.

(51) Int. Cl.
| | | |
|---|---|---|
| *H02J 7/00* | (2006.01) | |
| *H01M 50/20* | (2021.01) | |
| *H02J 7/14* | (2006.01) | |
| *H02M 7/00* | (2006.01) | |

(52) U.S. Cl.
CPC .......... *H01M 50/20* (2021.01); *H02J 7/0013* (2013.01); *H02J 7/0042* (2013.01); *H02J 7/143* (2020.01); *H02M 7/003* (2013.01)

(58) Field of Classification Search
None
See application file for complete search history.

(56) References Cited

U.S. PATENT DOCUMENTS

| | | |
|---|---|---|
| 7,135,836 B2 | 11/2006 | Kutkut et al. |
| 7,626,356 B2 | 12/2009 | Elgie et al. |
| 7,898,212 B2 | 3/2011 | Benn et al. |
| 9,385,351 B2 | 7/2016 | Workman et al. |
| 9,819,060 B2 | 11/2017 | O'Hora |
| 10,122,178 B2 | 11/2018 | Sachs et al. |
| 10,500,980 B2 | 12/2019 | Conlon et al. |
| 10,523,018 B2 | 12/2019 | Stacey et al. |
| 2013/0043826 A1* | 2/2013 | Workman ............ H01M 50/20 320/101 |
| 2013/0154569 A1 | 7/2013 | Endo et al. |
| 2015/0207344 A1* | 7/2015 | Wang ...................... B60K 6/28 180/65.21 |
| 2017/0207631 A1 | 7/2017 | Helling et al. |

* cited by examiner

*Primary Examiner* — Arun C Williams

(57) ABSTRACT

The application describes systems and methods for a modular portable power plant system including a first module having a first bank of one or more batteries and a second module that is detachably connectable to the first module. The second module includes a first DC to AC power inverter that is in electrical communications with the first bank of one or more batteries. The first module can be configured to house a first bank of one or more batteries arranged in a first configuration or a second configuration such that the first module includes a reconfigurable battery rack assembly arranged to be reconfigurable to provide support for a first battery set in the first configuration and a second battery set in the second configuration.

19 Claims, 13 Drawing Sheets

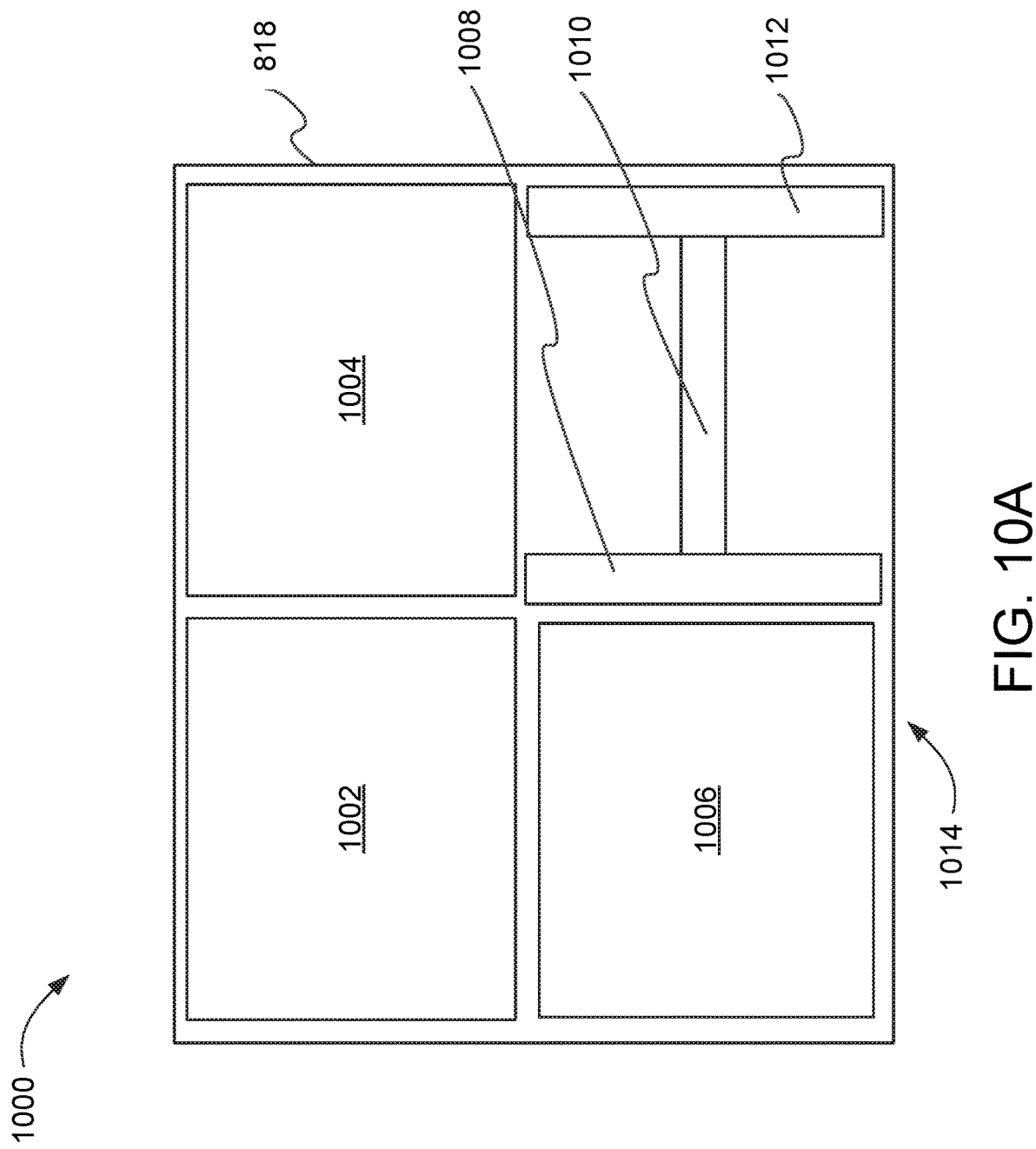

MODULAR PORTABLE POWER SYSTEMS AND METHODS

REFERENCE TO RELATED APPLICATIONS

This application claims priority to and the benefit of U.S. Provisional Patent Application No. 62/817,093, filed on Mar. 12, 2019, entitled "Portable Modular Power Systems and Methods" and U.S. Provisional Patent Application No. 62/853,817, filed on May 29, 2019, entitled "Portable Modular Power Systems and Methods," the entire contents of which are incorporated herein by reference.

FIELD OF THE DISCLOSURE

The disclosure relates generally to power supply systems and methods. More particularly, in various aspects, the disclosure relates to modular portable power systems and methods.

BACKGROUND

Consumers and companies have become increasingly concerned about implementing backup power systems to provide power when utility power is lost. During recent disasters such as Hurricane Katrina, utility power was unavailable for many weeks or months. Those survivors fortunate enough to have generators were able to generate their own power to light their home, run a refrigerator, and run other appliances. Critical infrastructure such as hospitals, police stations, and government facilities often have backup generator systems to maintain power to critical systems when utility power is lost. While backup generators can provide power during utility outages, such generators may not provide power efficiently, resulting in excessive consumption of fuel. Larger diesel powered generators at certain facilities may have a relatively large fuel reserve. Consumers, however, may only have enough gasoline to power their generator for 8, 12, or 24 hours. Storage of large amounts of gasoline can be very dangerous. Furthermore, gasoline has a shelf life of about 2 years depending on how it is stored and if a preservative is added. Hence, it is not safe or practical to store a large amount of gasoline. Another issue is that gas stations usually lose power during disasters, preventing their pumps from dispensing much needed gasoline. Hence, consumers may run out of gasoline within days and not be able to obtain additional fuel.

A potentially safer alternative fuel is liquid propane gas (LPG), which can be stored relatively safely for a very long period of time. However, LPG generators typical consume propane inefficiently, resulting in a need to replenish the propane supply to run the LPG generator. Again, a relative large home generator (e.g., 20 KW), may consume 50 gallons of propane or more each day. Even with a large propane tank, e.g., 250 gallon capacity, a 20 KW generator may consume about a 150 gallons of propane in about three days. At about 100 gallons, the propane tank may not produce enough pressure to run the generator. While propane fuel and a propane generator may extend the use of a generator, the user will still have to refuel at some point. Yet another alternative is to use natural gas to power a generator. This may be the best option as long as the natural gas supply is not interrupted during a disaster. However, not all homes have a natural gas utility connection and natural gas consumption can be excessive and costly. Additionally, all types of gas generators emit carbon monoxide which can be deadly. Gas powered generators must always be used outdoors or in locations that prevent carbon monoxide from entering living spaces.

Alternatives to power generators include solar and wind power with battery storage systems. Such systems often provide off-grid power to homes or provide on-grid supplemental power. Batteries can be heavy and difficult to move or store in a consumer's home, vehicle, or facility. Depending on how a battery bank is configured, a failure of one battery could cause a failure of the whole battery bank. Unfortunately, many consumers in urban or suburban areas find these system to be too costly or impractical to implement in their homes. Consumers in these areas may lose power infrequently and only for several hours. Gas generators or elaborate solar battery based systems may be too costly or impractical to use for such infrequent and limited power losses. But, for those in areas susceptible to extended power losses, it may be useful to supplement their exiting gas powered generators with an alternative power source to reduce wear on the generator and extend generator operations before refueling is necessary.

Hence, there is a need to more efficiently, practically, reliably, and safely provide backup power that may or may not supplement or extend the operation of existing generators before refueling.

SUMMARY

The application, in various embodiments, addresses the deficiencies associated with providing backup power safely and more efficiently.

In one aspect, the present disclosure includes a portable and modular power plant system including a first module configured to store or house a first bank of one or more batteries. The system includes a second module, being detachably connectable to the first module, where the second module includes a first DC to AC power inverter, configured to be in electrical communications with the first bank of one or more batteries when stored in the first module. The second module may be configured to output power up to a first power limit and provide an AC sine wave of a first type. A modular portable power system comprising:

The first bank of one or more batteries may be arranged in a first configuration or a second configuration, or more configurations. To enable such reconfigurations, the first module may include a reconfigurable battery rack assembly arranged to be configured to provide support for a first battery set in the first configuration and a second battery set in the second configuration, or further battery sets in further configurations. The number of batteries in the first battery set may be different than the number of batteries in the second battery set, or other battery sets.

The second module may include a second DC to AC power inverter in electrical communications with the first bank of one or more batteries, where the second DC to AC power inverter is configured to output power up to a second power limit and provide an AC sine wave of a second type. The first type may be a pure sine wave and the second type may be a modified sine wave. The first power limit may be less than the second power limit. The first power limit may be configured to supply sufficient power to loads requiring a pure sine wave. The second power limit may be configured to supply sufficient power to loads capable of using a modified sine wave.

In one implementation, the first DC to AC power inverter is in electrical communications with the first bank of one or more batteries via a switch array. The switch array may include one or more switches, where the one or more switches are configurable to disconnect one or more batteries of the first bank from electrical communications with the first DC to AC power inverter. The second DC to AC power inverter may be in electrical communications with the first bank of one or more batteries via the switch array.

In one configurations, a controller is arranged to monitor one or more parameters of the first bank and, in response, set the position of one or more switches of the switch array. The system may include at least one of a vehicle battery charging interface, a solar charging system interface, a generator and/or charging interface from a utility AC outlet. The system may include at least one electrical sensor arranged to detect at least one of battery voltage, battery current, and output power. The system may include at least one display arranged to display one or more parameters detected by the at least one electrical sensor.

In one implementation, the first and second modules are portable. At least one of the first and second modules may include wheels arranged to enable the system to be moved from a first location to a second location. At least one of the first and second modules may include one or more handles arranged to enable a user to perform at least one of tilt, move, push, and pull the system. The system may include a third module arranged to include a wireless communications interface, where the third module is detachably mechanically and/or electrically connected to the second module. The system may include more modules that are detachably connectable to one or more of any other modules of the system. In some implementations, the system includes a reconfigurable battery rack and/or frame assembly arranged to be reconfigured to provide support for a first battery set in a first configuration and a second battery set in a second configuration, where the number of batteries in the first battery set is different than the number of batteries in the second battery set. The battery rack assembly may be further reconfigured to support three batteries or four batteries by, in one implementation, reconfiguring a portion of the components of the rack assembly from supporting one or more batteries in one configuration to supporting one or more batteries in a second configuration. For example, a system may be initially configured with one battery, but then subsequently and/or incrementally additional batteries may be added to the system. As each new battery is added, the configuration of the battery rack assembly is re-arranged and/or configured to provide support for the installed batteries.

In some implementation, one or more components of the rack and/or frame assembly includes one or more dadoes or trenches to enable one or more components to be joined perpendicularly with one or more other components. Other types of connectors may be implemented to connect the one or more components of the battery rack and/or frame assembly including, without limitation, brackets, clamps, magnets, dove tails, glue, screws, nails, and the like.

Another aspect includes a method for providing electrical power including: providing a first module including a first bank of one or more batteries; providing a second module having a first DC to AC power inverter configured to provide output power up to a first power limit and provide an AC sine wave of a first type; mechanically connecting the first module to the second module; and electrically connecting the first bank of one or more batteries to the first DC to AC power inverter.

DRAWINGS

The foregoing and other objects and advantages of the disclosure will be appreciated more fully from the following further description thereof, with reference to the accompanying drawings. The skilled person in the art will understand that the drawings, described below, are for illustration purposes only. The drawings are not intended to limit the scope of the applicant's teaching in any way.

FIG. 1 includes a block diagram of modular portable power plant (MPP) system;

FIG. 2 shows a perspective view of an MPP including three modules;

FIG. 3 includes a diagram of a power system including various power supplies that a connectable to an MPP of FIG. 1;

FIG. 4 is a diagram of an MPP power system including a bank of batteries and a switch configuration enabling multiple parallel battery configurations;

FIG. 5 includes a functional block diagram of a computer that may be implemented in an MPP.

FIG. 6 shows a perspective view of a module 106 holding four batteries 604, 606, 608, and 610 within its housing;

FIG. 10A shows a top down view of the battery housing of FIGS. 7, 8, and 9 including three batteries being positioned in the housing by a portion of the reconfigurable rack assembly in a third configuration;

DESCRIPTION

Figure 1:
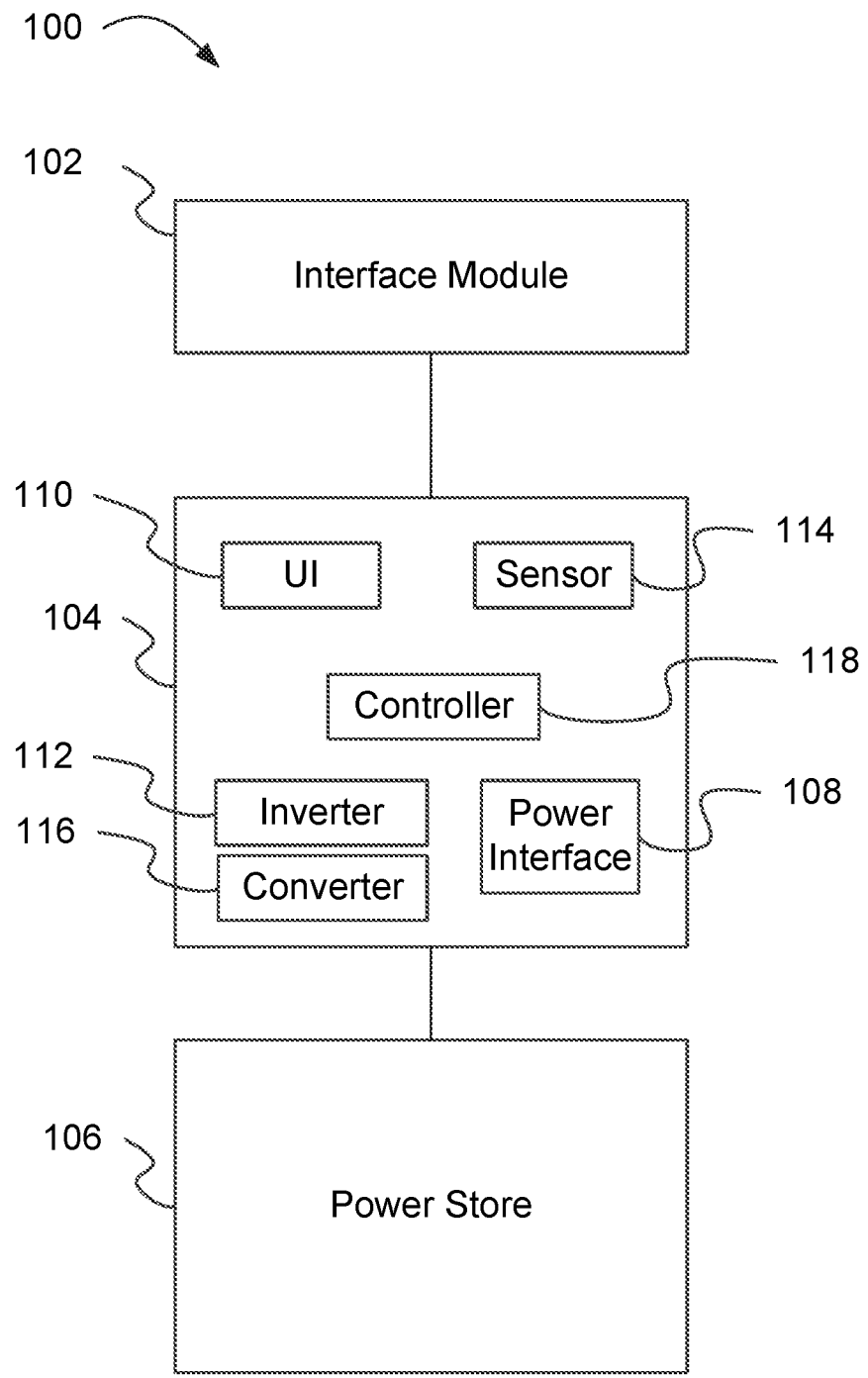

While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

The application describes systems and methods related to a portable modular power plant or system configured to provide power to a consumer's home or other facility. A modular portable power plant (MPP) may be flexibly configured and reconfigured in ways that enable various different configurations of battery banks, inverters, chargers, power supply interfaces, and/or user interfaces. The MPP may include multiple housings or modules that are detachably connectable to each other to enable any one or more of the modules to be re-arranged, removed and/or replaced with an alternatively configured module or to more efficiently replace a possibly faulty module with a new module of the same configuration. For example, a first module or housing may include an energy or power store having one or more batteries. A second module or housing may include DC to AC inverter 112 that converts 12 volts DC power from the one or more batteries in the first module to 115 volts AC that can be outputted from the second module 104 to one or more devices or appliances of a consumer. The MPP may include other types of inverters and/or converters such as, for example, a DC to DC converter or an AC to DC converter 116. Multiple modules may be mechanically and/or electrically connected together to form an integrated overall portable unit.

The second module may include a user interface including a display that may display power consumption, battery voltage, AC output voltage, battery and/or inverter output current, battery temperature, and so on. The user interface may enable a user to configure how the one or more batteries are connected to each other and/or to the one or more inverters. The second module may include one or more power supply interfaces configured to receive power and use that power to charge the one or more batteries in the first module. The power supply interfaces may include a battery charger to facilitate battery charging. A power supply interface may include a battery maintainer to maintain the one or more batteries at full charge without overcharging. The MPP may include a third detachably connectable module that may include, for example, a solar charging controller that receives power from one or more solar panels and provides a charging current to the one or more batteries.

In some configurations, a solar charging controller is implemented in the second module. But, it may be advantageous to implement the solar charging panel in the third module to enable distribution of an MPP with only the first and second modules for those users that are not interested in a solar charging capability. But, if they change their mind later, the third module can be flexibly connected to the MPP to provide such capability. The third module may include other add-on capabilities such as, without limitation, a processor configured to provide more sophisticated monitoring and control of the one or more batteries, inverters, charge controllers, and charge maintainers, an atmospheric sensor, a second or more inverter providing a different voltage output than the inverter in the second module or a different quality waveform, a transfer switch, a remote control for another power source such as a generator, one or more lights, wireless interface to facilitate remote monitoring or control via the Internet or another network, one or more cameras, and so on. The modules may be stackable in such a way to enable more convenient movement of the MPP. In some configurations, at least one module includes wheels that enable the MPP to be rolled from one location to another. At least one module may include a handle that enables a user to push, pull, lift, move, and/or place the MPP in a particular location and/or position.

FIG. 1 includes a block diagram of modular power plant (MPP) system 100. The MPP 100 includes a first module 102, a second module 104, and a third module 106. The second module 104 may include a controller 118, a processor, a DC to AC inverter 112, an AC to DC converter 116, a user interface 110, one or more sensors 114, and/or one or more power interfaces 108. The first module 102 may include one or more power interfaces, one or more inverters, one or more processors, and/or one or more displays. The first module 102 may include a housing arranged to protect one or more interfaces of the second module 104. The controller 118 may include a processor such as describe with respect to FIG. 5.

The second module 104 may include one or more power interfaces, one or more inverters, one or more processors, and/or one or more displays. The power interface 108 may include one or more AC and/or DC receptacles. An AC receptacle may be a single phase or three phase AC receptacle capable of supplying AC power to a load. An AC receptacle may support standard voltage outputs such as, without limitation, 110 VAC and 220 VAC, and/or voltages with acceptable tolerances thereof. Module 104 may include one or more DC receptacles to provide DC voltage from converter 116 and/or batteries in module 106. DC voltage outputs may include, without limitation, 6 VDC, 12 VDC, 24 VDC, 48 VDC, and so on. The third module 106 may be a housing for a power store including one or more batteries. The second module 104 may be detachably connectable to the third module 106.

The second module 104 may be detachably connectable to the first module 102. The configuration of connections may be reconfigured in various ways. For example, the first module 102 may be positioned in between and connected to the second and third modules 104 and 106. In some configurations, the third module 106 may be positioned in between and connected to modules 102 and 104. The sensor 114 may include one or more sensors including, without limitation, a proximity sensor, sonar sensor, module housing temperature in at least one of modules 202, 204, and 206, accelerometer, GPS, battery temperature, air chemistry, sound level, and so on.

The connections between modules may include a physical and/or mechanical connector. The connections between modules may include an electrical connector to facilitate electronic and/or electrical power communications between modules. The mechanical connector may include, without limitation, a latch, a catch, slide barrel mechanism, grabber mechanism, magnet, strap, Velcro, and the like. The electrical connector may include a port, one or more sockets, one or more terminals, a push-pull connector, an electro-mechanical connector, male-female connector, a DIN connector, a terminal block, posts, plug-socket connector, blade connector, ring and spade terminal, twist-on wire connector, 8P8C connector, D-subminiature (D-sub) connector, USB connector, power connector, RF connector, DC connector, hybrid connector, banana connector, crown spring connector, barrier strip/spade lug, crimp, alligator clip, screw terminal, pogo pin, edge connector, JST connector, phone connector, RJ connector, optical fiber connector, dock connector, and/or coaxial cable connector.

In operation, for example, module 106 may include a bank of 1, 2, 3, or 4 batteries, or more. Any type of battery may be employed such as without limitation, a lead acid battery, lithium ion (Li-ion) battery, Nickel-Metal Hydride (Ni-MH), Nickel Cadmium (Ni—Cd). The battery may include a valve-regulated lead acid battery (VRLA). A VLRA battery may include an absorbed glass mat (AGM) battery or Gel battery. A battery may have a voltage output of approximately 1 volt, 2 volts, 3 volts, 4 volts, 4.2 volts, 6 volts, 12 volts, 24 volts, or 48 volts, and so on. Battery capacity may include, without limitation, 50 Amp-hours (Ah), 100 Ah, 125 Ah, 225 Ah, 250 Ah and so on. In one configuration, up to two 12 volt 100 Ah batteries are electronically connected in parallel to provide a 12 volt 200 Ah battery power supply. In another configuration, two 6 volt 225 Ah batteries are connected in series to provide 12 volt 225 Ah power supply. In a further configuration, up to four 12 volt 100 Ah batteries can be connected in parallel to provide up to a 12 volt 400 Ah power supply. As will be discussed further with respect to FIG. 4, a switch array 404 may be implemented that can flexible reconfigure the bank of four batteries to add and/or remove any one or more of the four batteries from the four-battery bank that is connected to one or more inverters. The battery power supply may be configured in various way by selecting the output voltage and series/parallel connection configuration to match the requirements of the inverter 112. For a bank including two batteries, the switch array may be configured to connect both batteries in parallel or connect either battery individually to one or more inverters.

The module 106 battery bank may be connected to inverter 112 located within module 104. The inverter 112 may be configured to receive 12 volts DC as an input while outputting 110 volts AC. The inverter 112 may include a modified sine wave inverter and/or a pure sine wave inverter. A pure sine wave inverter may be implemented to provide a cleaner signal to power sensitive electronic equipment or devices using a sensitive motor such as a pellet stove. The inverter 112 may have a continuous output power of about 300 watts, 500 watts, 600 watts, 800 watts, 1000 watts, 1200 watts, 1500 watts, 2000 watts, 2500 watts, 3000 watts, 4000 watts, 5000 watts, 10000 watts, and so on. A pure sine wave inverter may cost twice as much as a modified sine wave inverter with the same power output because of the increased complexity (additional signal control and filtering) in generating a clean sine wave and more consistent voltage amplitude. The inverter 112 may output single phase and/or three phase AC voltage and current. The inverter 112 may output AC voltages at or about 110-120 volts and/or at or about 220 to 240 volts. Inverter 112 may output AC voltages in the range of 110 to 1200 kV AC. The frequency of the AC voltage may be about 50 Hz or 60 Hz, or any multiple frequency thereof.

The MPP 100 advantageously enables configurations of a power supply system that are more efficiently and appropriately tailored to the needs of a particular user's home or facility. For instance, a consumer may only need power for a refrigerator and several lights for a few days. If the refrigerator and lights can run using a modified sine wave, the MMP 100 can be configured to include a 12 volt DC input 1000 watt output modified sine wave inverter 112 in module 104 and a battery bank including two 12 volt 100 Ah AGM batteries in parallel to provide 200 amp hours current when fully charged (or about 2400 watts power). Based on battery physics, it is generally considered appropriate to discharge a battery bank to about 70% to 50% of full capacity to prolong battery life. Assuming the AGM batteries can be discharged to about 50% of full charge capacity, the battery bank would provide about 100 Ah (or about 1200 watts) until recharge is needed. Depending on the refrigerator and lights power consumption, the MMP 100, in this configuration, could probably provide power for about 5 days before needing a recharge. If the user later wants the MPP 100 to power a sensitive computer, then the current module 104 including a modified sine wave inverter can be replaced with a new module 104 including a 12 volt DC input 1000 watt output pure sine wave inverter without having to update module 106 with its two 100 Ah batteries.

But, if a user wants to power a pellet stove for about 16 hours, the MPP 100 may be configured with a larger battery bank and more powerful pure sine wave inverter. For example, module 104 may be configured with a 12 volt DC input 1000 watt pure sine wave inverter, while module 106 is configured with a four 12 volt DC 100 Ah AGM batteries for a total output current of about 400 amp hours (or total output power of about 4800 watts). As discussed above, only about 200 amp hours would be usable (or 2400 watts) before recharge was required. If the pellet stove is rated at 100 watts/hr power consumption, then the MPP 100 can power the pellet stove for about 24 hrs before the batteries need recharging (e.g., 24×100 watts=2400 watts consumed=2400 watts from batteries to 50% capacity). If the user wants to power an air conditioning (AC) unit that has a startup surge of about 2500 watts and then continuous power draw of about 100 watts/hr, the module 104 with a 1000 watt inverter 112 would have to be replaced with a another module having a 1500 watt inverter (with 3000 watt instantaneous/surge power limit) to enable the MPP 100 to provide sufficient current and power to the AC unit at startup. Hence, depending on the types of devices to be powered and the desired period of time to provide power, module 104 can be configured with the appropriate inverter 112 while module 106 can be configured with the appropriate battery configuration.

Module 102 may be configured to include a solar panel interface and/or charge controller to recharge the batteries in module 106 via solar panels. Depending on the space available in the housing of module 104, the solar panel interface may be included in module 104. Regardless, module 102 may be configured with any number of add-on features and/or devices for the MPP 100. Hence, the MPP 100 may be initially configured with only modules 104 and 106, while module 102 or other modules are subsequently added to MPP 100 to include additional features and capabilities. For example, a user may want to add wireless monitoring and/or control capability later after an initial configuration with modules 104 and 106. Module 102 may be added to the MPP 200 that includes an 802.11 transceiver and/or mobile network transceiver (e.g., LTE, 4G, and/or 5G). The wireless transceiver may interface with a controller within module 102 and/or module 104 to obtain operational information (e.g., battery voltage, battery amps, battery temperature, output power, etc. . . . ). The wireless transceiver may enable a user to remotely control the MPP 200 via a mobile phone or remote computer using a client application that interfaces with a control application. The control application may enable a user to remotely turn on or off the inverter 112, turn on or off a charge controller, reconfigure the battery connections, activate a camera in one of the modules, configure automatic shutoff thresholds for one or more inverter based on, for example, battery temperature, carbon monoxide levels, ambient temperature, smoke detection, AC output current, battery current, and so on. In some implementation, any of the features of module 102 may be implemented in module 104.

Module 102 or 104 may include a second inverter that has capabilities different than inverter 112. For example, the second inverter may be a 600 watt pure sine wave inverter while inverter 112 is a 2500 watt modified sine wave inverter. The second inverter may be used to provide cleaner power to sensitive devices while inverter 112 is used to provide high surge power to a sump pump capable of running off a modified sine wave. Given that a modified sine wave typically cost less than half the price of a pure sine wave inverter with the same power output capacity (and requires less complex circuitry), the combination of pure and modified sine wave inverters enables the MPP 200 to advantageously provide high surge power using a less clean, but more powerful AC signal for non-sensitive equipment, while using a clean, but less powerful AC signal for sensitive devices. In some implementations, the second inverter is included within module 104 along with inverter 112. The MPP 200 in any module may include, without limitation, a smoke detector, fire detector, temperature detector, moisture detector, carbon monoxide detector, one or more cameras, one or more motion sensors, a GPS unit, and so on.

Module 106 may be configured to store one or more batteries that may be electronically in communication with an inverter 112 of module 104 via a switch array 404 of user interface 110.

Figure 2:
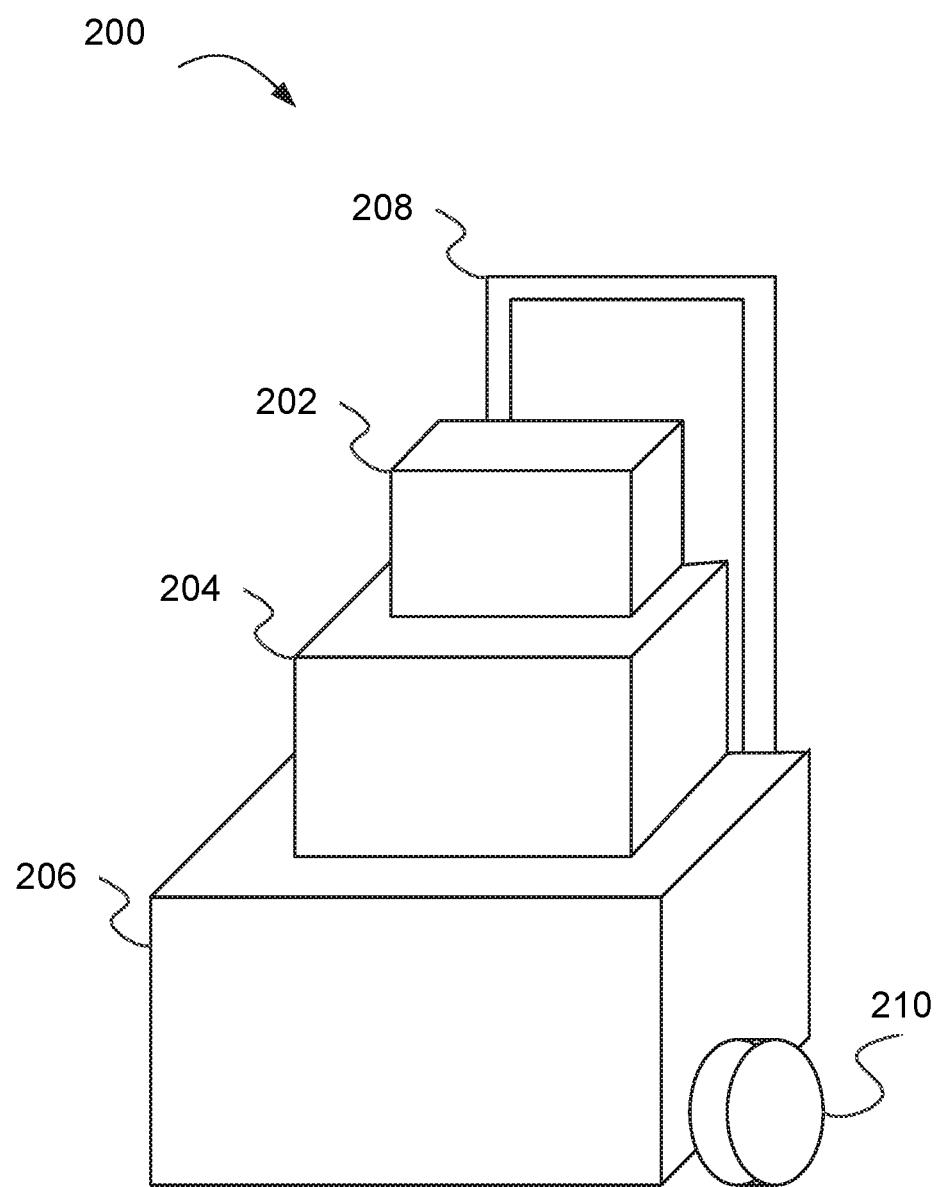

FIG. 2 shows a perspective view an MPP 200 including three modules 202, 204, and 206. The modules 202, 204, and 206 may include the functionality as discussed with respect to modules 102, 104, and 106 of FIG. 1. In one configuration, module 206 includes wheels 210 to enable the MPP 200 to be rolled from a first location to a second location. In other implementations, other types of mobility mechanisms in addition to or in the alternative to the wheel 210, may be employed. For example, a mobility mechanism may include, without limitation, certain ones of or a combination of wheels, rollers, tracks, spindles, a hover system, one or more skis, one or more floatation elements, and so on. The mobility mechanism may include an electronic motor and may be powered electronically by one or more batteries of the system (DC) and/or by one or more inverters (AC) of the system. In some configurations, the controller 428 may interface with the electronic motor to control the operation of the motor. The controller 428 may include a user interface to enable a user to operate the motor to enable movement of the system. In some implementations, the controller 428 may include a wired and/or wireless interface to facilitate communications with a wired or wireless remote control device that a user can interface with to send movement commands to the controller 428, which in turn controls the operation of the electronic motor to facilitate movement of the system.

The mobility mechanism may include a steering mechanism to enable the system to be steered in a direction, rotated, and/or turned to facilitate movement to a desired location. In some implementations, the mobility mechanism may be positioned within one of the modules or in a separate, e.g., fourth module, that may be detachably connectable to one or more of any other modules of the system 200.

The MMP 200 may include a handle 208 that enables a user to tilt the MPP 200 like a dolly and then push and/or pull the MPP 200 to a desired location. A handle is a holding mechanism may include, without limitation, a nob, shaft, stem, arm, hilt, haft, crank, lip, grip, or any element that can be grasped by a user, and so on. In some implementations, the modules 202, 204, and 206 are stacked vertically on top of each other as shown in FIG. 2. In some configurations, other modules may be stacked vertically or connects horizontally to one or more of the modules 102, 104, and 106. The MPP 200 may be mounted on a floor, shelf, vehicle, larger storage container, and the like. The number of modules of the MPP 200 may be one, two, three, or any number that is structurally stable, which may be more than the three illustrated in FIG. 2.

Figure 3:
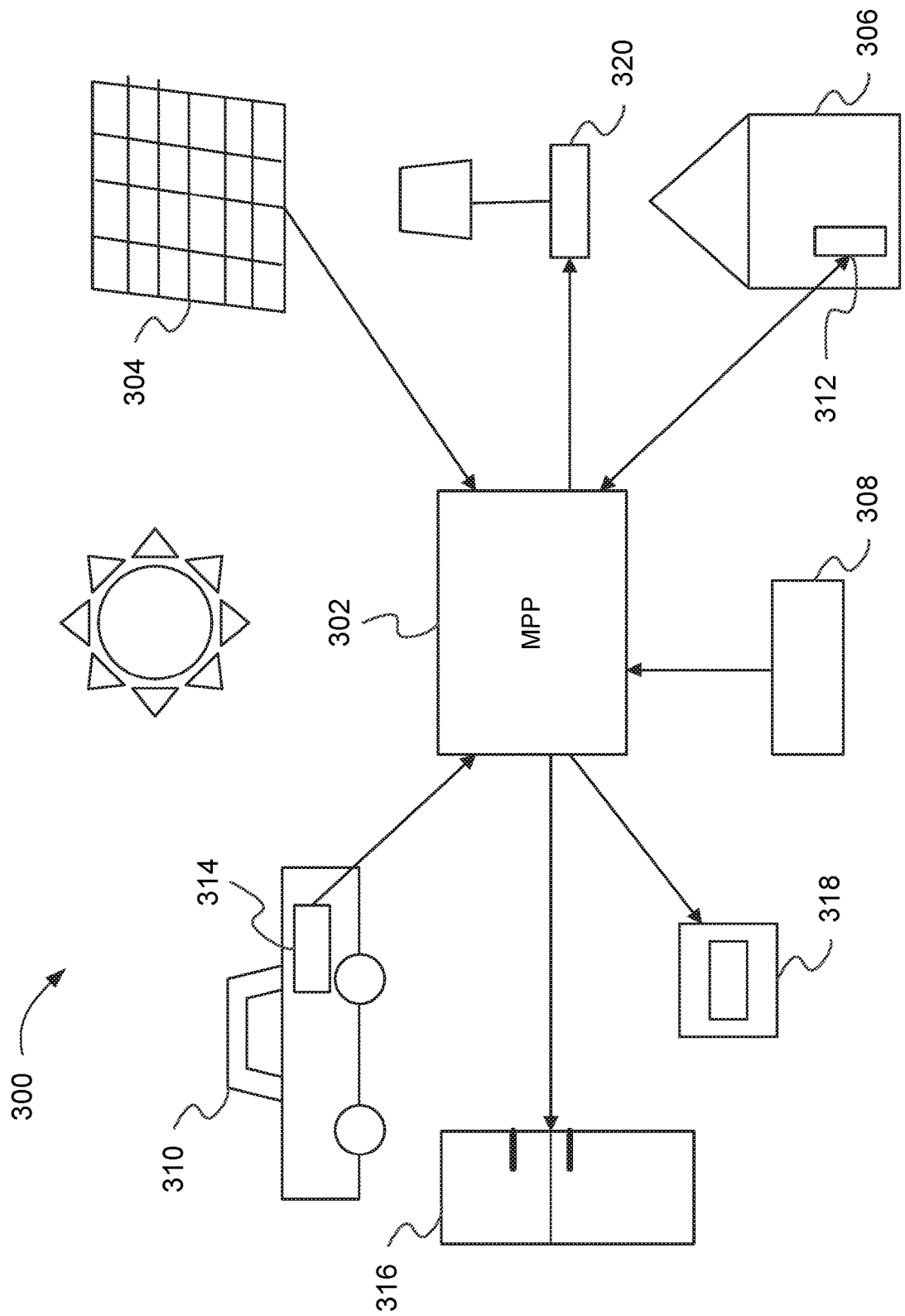

FIG. 3 includes a diagram of a power supply system 300 including various power supplies that a connectable to an MPP such as MPP 100 of FIG. 1. The system 300 includes an MPP 302 that is electronically connected to various power supplies and power loads. The power sources or supplies include a battery 314 within a vehicle, generator 308, home outlet 312 power from a power utility, and a solar panel 304. The MPP 302 may output AC voltage at about 110 volts, 220 volts, 440 volts, and so on. In exemplary FIG. 3, the MPP 302 is outputting about 110 volts to power a refrigerator 316, a stove 318, and a light 320. Hence, the MPP 302 may be configured to interface with one or more power sources to recharge it batteries. The MPP 302 may be configured to enable concurrent charge from multiple power sources 314, 308, 306, and/or 304. The MPP 320 may be configured to connect with multiple power sources, but only receive power from one or a portion of the available power sources.

By being configured to access multiple different power sources, the MPP 302 advantageously enables redundant power sourcing to increase the probability and reliability that at least one source of power is available during a power outage or disaster. While a user may have a gas generator, if the generator fails, the MPP 302 may be configured to interface with a solar system including solar panel 304 to provide an alternative source of power to recharge the batteries of the MPP 302. If a solar panel 304 is not available, the MPP 302 may be connected to the battery 314 and/or alternator of a vehicle to facilitate recharging of the MPP 302 batteries.

In some instances, the MPP 302 may be utilized to supplement another backup power source such as a gas generator 308. For example, the gas generator 308 may be run for about 8 hrs a day to provide power to the user's home or facility. During that 8 hrs period, the MPP 302 may be connected to the generator 308 to facilitate charging of the batteries of the MPP 302. The generator 308 may be shutdown at night or during parts of the day when minimal power is needed. During generator 308 shutdown, MPP 302 may provide power to certain appliances, devices, and/or equipment. For example, MPP 302 may efficiently provide power to a stove 318 at night to maintain heat within a home or facility while the generator is off. By using the MPP 302 in conjunction with a generator 308, the amount of wear on and fuel consumed by the generator 308 can be substantially reduced and, thereby, extend the period of time before more fuel must be acquired to power the generator 308. A large generator, e.g, a 13 KW or 20 KW, will inefficiently consume substantially amounts of fuel especially when load demand is low. By switching power to the MPP 302 during lower load demand periods, overall power consumption is reduced and more efficiently utilized.

The MPP 302 may include a solar power regulator and/or charge controller to control the charging rate of the batteries of the MPP 302 via solar panel 304. The MPP 302 may include a charger and/or battery maintainer to receive power from the generator 308 and/or outlet 312 to control charging rate and also to maintain the batteries of the MPP 302 at a particular charge level, while avoiding overcharging of the batteries. The charger and/or battery maintainer may include an AC to DC converter that converter AC voltage and current to DC voltage and current. A battery maintainer can advantageous enable the MPP 302 to maintain its batteries at maximum charge for extended periods of time until a MPP 302 is needed to provide backup power. The MPP 302 may include a set of positive and negative jumper connections to enable a user to connect a battery 314 from a vehicle 310 to the jumper connections of the MPP 302 via battery jumper cables. The MPP 302 may include a display that interfaces with one or more sensors of the MPP 302 to display system information such as battery voltage, battery current, output power, and so on. In some instances, a user may monitor battery voltage during charging operations to determine when the batteries have been fully charged and to avoid overcharging. The user may use the display to determine when to terminate discharge of the batteries, e.g., when the battery voltage is at a level indicating 50% discharge of the batteries or some other level.

Figure 4:
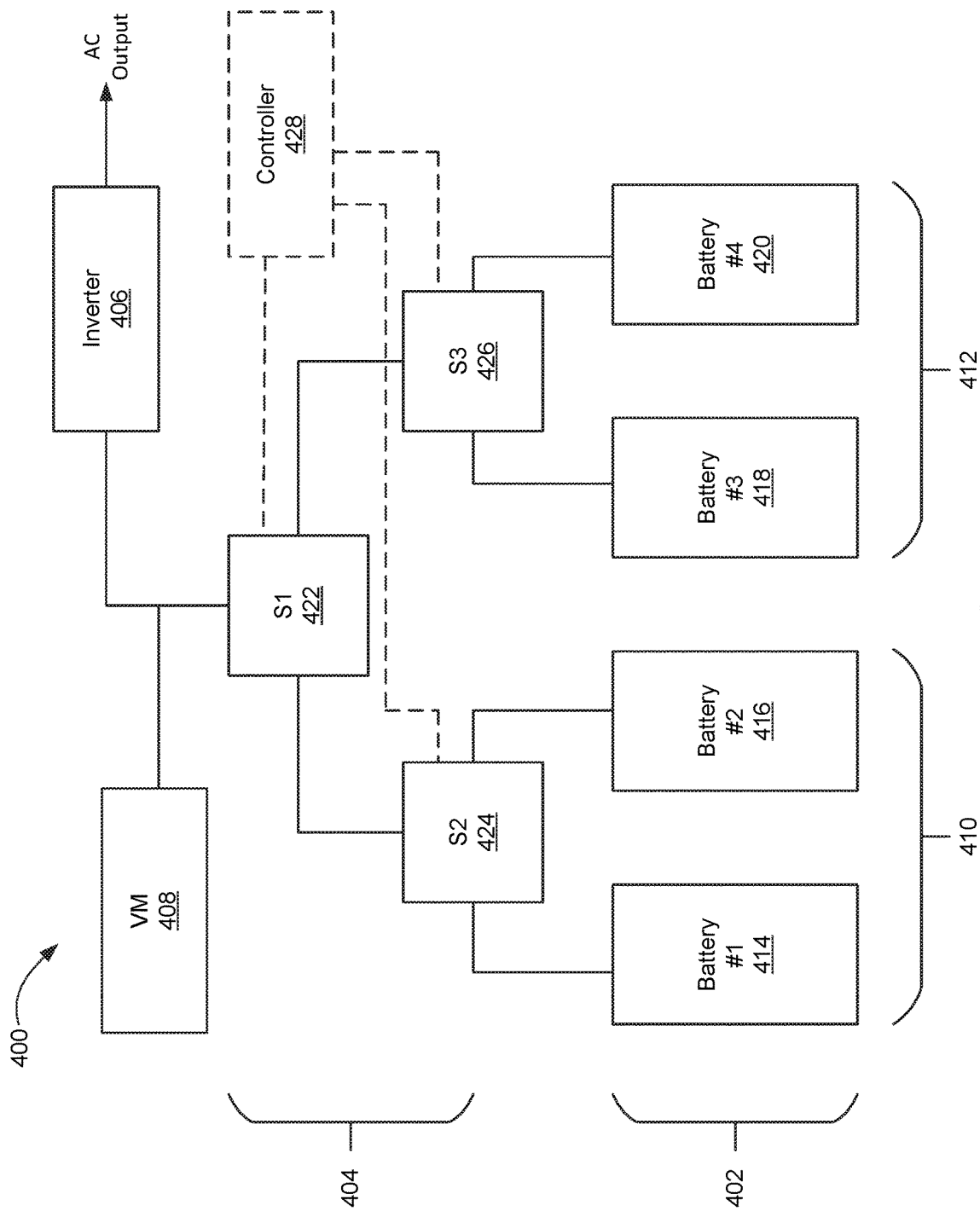

FIG. 4 is a diagram of an MPP system 400 including a bank 402 of batteries and a switch array 404 enabling multiple parallel or single battery configurations. When the bank 402 shows four batteries, the system 400 may include 1, 2, 3, 4, 8, 10, 16, 20, 24, or any number of batteries to meet the power needs of a home or facility. In exemplary FIG. 4, bank 402 includes four batteries arranged in a parallel configuration. Bank 402 includes two sub-banks 410 and 412, where each sub-bank 410 and 412 include two batteries. The batteries may be, for example, 12 volt 100 Ah AGM batteries. The system 400 may include a switch array 404 that enables selection of any combination of batteries in parallel or singularly. The switches S1, S2, and S3 may be 4-position switches with the following positions: all open, select a first bank (or first battery), select a second bank (or second battery), select both banks (or select both the first and second battery). For example, switch S1 may be positioned to connect bank 410 to inverter 406, connect bank 412 to inverter 406, connect both banks 410 and 412 to inverter 406, or to disconnect (open the connection) both banks 410 and 412 from inverter 406. Hence, with switch S1 (i.e., switch 422) in the both disconnected position, the bank 402 is completely disconnected from the inverter 406. With switch S1 in the bank 410 position, both batteries of bank 410 (e.g, battery 1 and 2) are connected to the inverter 406. With switch S1 in the bank 412 position, both batteries of bank 412 (e.g, battery 3 and 4) are connected to the inverter 406. With switch S1 in the both banks position, both banks 410 and 412 are connected to inverter 406.

Switches S2 and S3 (i.e., switches 424 and 426) enable further isolation of batteries within their respect banks 410 and 412. For example, if switch S2 is in the both disconnected position, then neither battery 414 and 416 are connected to inverter 406 regardless of the position of S1. If switch S2 is in the battery 1 position, then battery 414 will be connected to inverter 406 if switch S1 is in the bank 410 position or both banks position. If switch S2 is in the battery 2 position, then battery 416 will be connected to inverter 406 if switch S1 is in the bank 410 position or both banks position. If switch S3 is in the both disconnected position, then neither battery 418 and 420 are connected to inverter 406 regardless of the position of S1. If switch S3 is in the battery 3 position, then battery 418 will be connected to inverter 406 if switch S1 is in the bank 412 position or both banks position. If switch S3 is in the battery 4 position, then battery 416 will be connected to inverter 406 if switch S1 is in the bank 412 position or both banks position. The array of switches 404, by various selection combinations enables the system 400 isolate (disconnect) any single battery 414, 416, 418, and 420 from the inverter 406. The selection of combinations allows for isolation of either bank 410 and 412 from inverter 406. The selection of combinations of switch positions enable any combination of batteries 414, 416, 418 and 420 to be connected to inverter 406.

The array of switches 404 advantageously enables system 400 to disconnect a failed battery and poor performing battery from the bank 402, which substantially improves the reliability and performance of the MPP system 400. A common concern with configuring multiple batteries in parallel is that it can be difficult to determine which battery of a parallel configuration is faulty. The switch array 404 advantageously enables the system 400 to individually isolate each battery for monitoring. For example, battery 414 can be isolated by setting S1 to the bank 410 position and setting S2 to the battery 1 position. In this instance only battery 414 is connected to inverter 406 and also connected to electronic sensor 408 which may detect the output voltage and/or current from battery 414. The detected voltage and/or current may be received by a processor and/or display of the system 400, which the user can view to determine whether battery 414 has failed or is performing inadequately. The switch array 404 can be configured to enable isolation of any one or more of the other batteries for monitoring and/or detection of failure. The switch array 404 may be configured to isolate one or more batteries to enable replacement or swap out of the one or more batteries while the other batteries and the system continues to provide output power.

The array of switches 404 may also enable incremental deployment of batteries 414, 416, 418, and 420. For example, the system 400 may initial have only one battery 414. The switch array 404 may be configured such that an electrical connection is only established between battery 414 and the inverter 406. (e.g., switch S1 set to bank 410 and switch S2 set to battery 1). Later, a second battery 416 may be added to the system and the switch 404 configured to enable electronic communications/power from both batteries 414 and 416 to inverter 406. (e.g., switch S1 set to bank 410 position and switch S2 set to "Both" position for batteries 414 and 416). When battery 418 is added to the system 400, switch S1 is set to the "Both" position to select banks 410 and 412, switch S2 is set to the "Both" position to select batteries 414 and 416, and switch S3 is set to the battery 418 position (i.e., "battery #3") to select battery 418. The three batteries 414, 416, and 418 are electrically connected to inverter 406. Further, when the four batteries 414, 416, 418, and 420 are installed, switches S1, S2, and S3 can be set to the "both" position so that all batteries 414, 416, 418, and 420 are connected in parallel to inverter 406.

Hence, the module 106 and switch array 404 enable a dynamically configurable battery bank that can include various battery bank arrangements and can enable incremental deployment of batteries resulting in incrementally increasing the storage capacity of the system. Alternatively, batteries may be electronically disconnected and/or removed from the system 400 to reduce the storage capacity. Also, batteries may be disconnected and removed from the system 400 to enable more efficient transport and/or shipping of the system 400. For example, a 12 volt 100 amp hour battery may weigh about 65 lbs. Four 12 volt 100 Ah batteries may weigh about 260 lbs. Including other components in module 104, the system 400 and/or 100 could weigh about 300 lbs. A system of such weight could be difficult to move manually, ship, or transport from one location to another. Instead, one or more batteries 414, 416, 418, and 420 may be removed from the system 400 and/or module 106 and shipped or transported separately from the system 400, 100, and/or 200. In this way, the weight of the system 200 may be reduced to about 40 lbs, while each battery may be shipped separately at about 65 lbs each.

In some implementations, the switch S1, S2, and/or S3 are mechanical switches that are manually positioned by a user. In some implementations, the switches S1, S2, and S3 are electronically actuated switches that may be controlled by a controller 428 and/or processor such as CPU 502 of the system 400. In some configurations, each battery 414, 416, 418, and 420 includes an electronic sensor in signal communication with a controller and/or processor of system 400 and/or controller 118. The system 400 may be configured to continuously monitor the electronic parameters of each battery during charge and/or discharge to determine each battery's status. In some implementation, the controller 428 may change the position of one or more switches of array 404 to isolate one or more batteries from inverter 406. In addition to sensing electrical parameters, such as current, voltage, and/or power, a sensor may detect battery pressure, hydrogen level, temperature, salinity, and so on. If any parameter exceeds a threshold limit, the controller 428 may use a control signal to change the position of one or more switches of array 404 to disconnect and/or isolate one or more batteries from inverter 406. The switches S1, S2, and S3 may include electronic actuators and/or servos to enable changes in their positions.

In one implementation, the switches S1, S2, and S3 may be configured according to the following Table 1 to enable various battery connection configurations. Each switch S1, S2 and S3 may have four positions: Bank 1 (or first battery), Bank 2 (or second), Both Banks (or both batteries), and open/off.

TABLE 1

Switch Array Positions for Battery Connection Configurations

| Connected Batteries | S1 position | S2 position | S3 position |
|---|---|---|---|
| 1 | Bank 1 | Batt 1 | Open/off |
| 2 | Bank 1 | Batt 2 | Open/off |
| 3 | Bank 2 | Open/off | Batt 3 |
| 4 | Bank 2 | Open/off | Batt 4 |
| 1, 2 | Bank 1 | Both | Open/off |
| 1, 3 | Both | Batt 1 | Batt 3 |
| 1, 4 | Both | Batt 1 | Batt 4 |
| 1, 2, 3 | Both | Both | Batt 3 |
| 1, 2, 4 | Both | Both | Batt 4 |
| 1, 3, 4 | Both | Batt 1 | Both |
| 1, 2, 3, 4 | Both | Both | Both |
| 2, 3 | Both | Batt 2 | Batt 3 |
| 2, 4 | Both | Batt 2 | Batt 4 |
| 3, 4 | Bank 2 | Open/off | Both |
| 2, 3, 4 | Both | Batt 2 | Both |
| none | Open/off | — | — |

Figure 5:
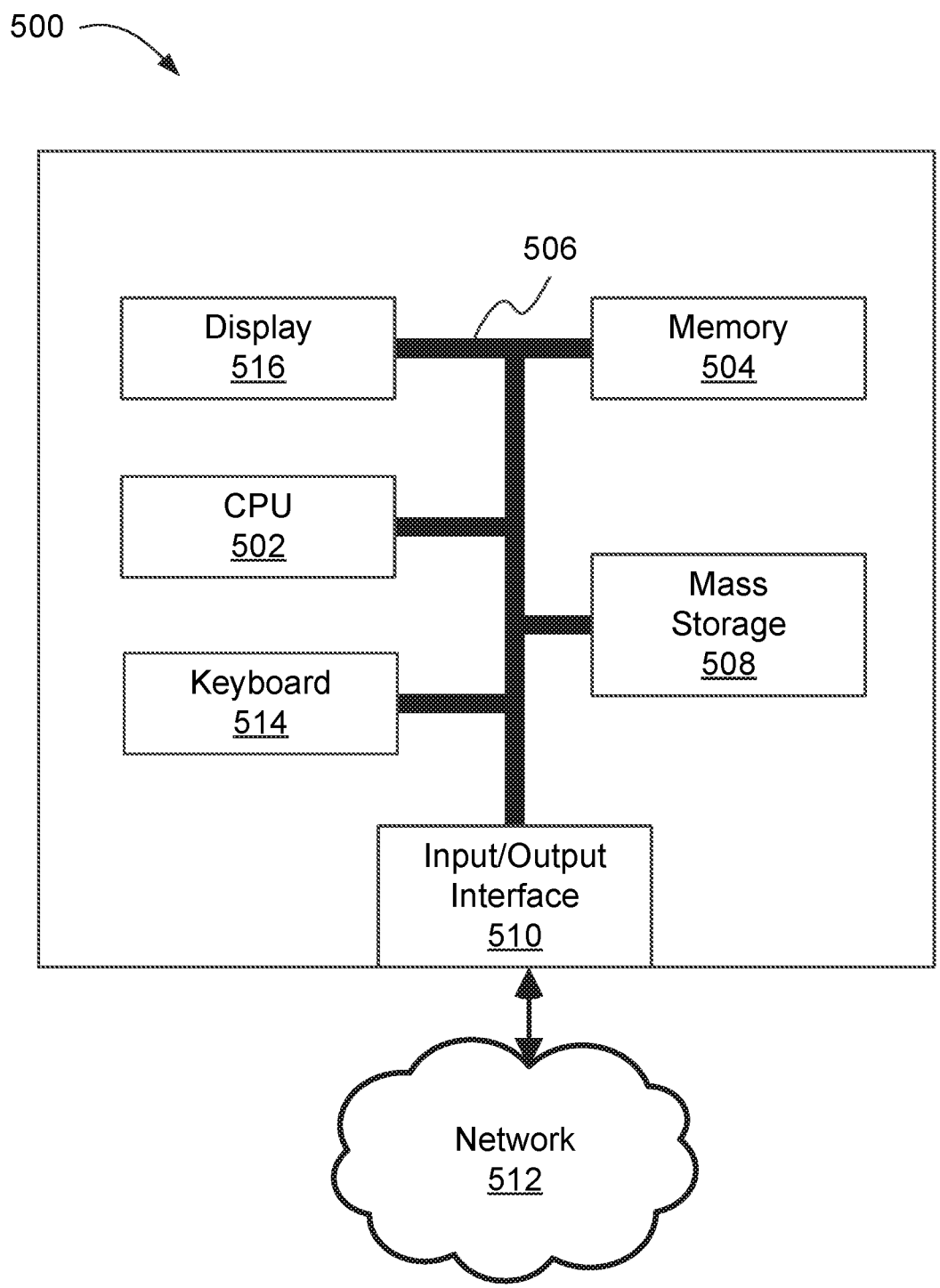

FIG. 5 includes a functional block diagram of a computer system 500 that may be implemented in an MPP such as MPP 100, 200, 302, or 400. The computer system 500 may include a central processing unit (CPU) 502, a memory 504, and an interconnect bus 506. The CPU 502 may include a single microprocessor or a plurality of microprocessors for configuring computer 500 as a multi-processor system. The memory 504 illustratively includes a main memory and a read only memory. The computer system 500 also includes the mass storage device 508 having, for example, various disk drives, solid state drives, tape drives, etc. The main memory 504 also includes dynamic random access memory (DRAM) and high-speed cache memory. In operation, the main memory 504 stores at least portions of instructions and data for execution by the CPU 502.

The mass storage 508 may include one or more magnetic disk, solid state, or tape drives or optical disk drives or memory sticks, for storing data and instructions for use by the CPU 502. At least one component of the mass storage system 508, in the form of a disk drive solid state drive, or tape drive, stores the database used for processing data derived from monitoring the batteries, inverters, and/or controller 118 of system 100. The mass storage system 508 may also include one or more drives for various portable media, such as a floppy disk, flash drive, a compact disc read only memory (CD-ROM, DVD, CD-RW, and variants), or an integrated circuit non-volatile memory adapter (i.e. PC-MCIA adapter) to input and output data and code to and from the computer system 200.

The computer system 500 may also include one or more input/output interfaces for communications, shown by way of example, as interface 510 for data communications via the network 512. The data interface 510 may be a modem, an Ethernet card or any other suitable data communications device. To provide the functions of a computer 500, the data interface 510 may provide a relatively high-speed link to a network 512, such as an intranet, internet, or the Internet, either directly or through another external interface. The communication link to the network 512 may be, for example, optical, wired, or wireless (e.g., via 802.11, satellite or cellular network). Alternatively, the computer system 500 may include a mainframe or other type of host computer system capable of Web-based communications via the network 512. The computer system 500 may include software for operating a network application such as a web server and/or web client.

The computer system 500 may also include suitable input/output ports, that may interface with a portable data storage device, or use the interconnect bus 506 for interconnection with a local display 516 and keyboard or keypad 514 or the like serving as a local user interface for programming and/or data retrieval purposes. The display 516 may include a touch screen capability to enable users to interface with the computer 500 by touching portions of the surface of the display 516. Server operations personnel may interact with the computer 500 for controlling and/or programming the system from remote terminal devices via the network 512. The computer system 500 may run a variety of application programs and store associated data in a database of mass storage system 508. One or more such applications may include a remote monitoring and/or control application.

As discussed above, the computer system 500 may include one or more applications that provide monitoring and/or control of various functions of the MPP 100. The computer system 500 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the computer system 500 where the computer 500 includes a Unix workstation, a Windows workstation, a LINUX workstation, or other type of workstation. Other operating systems may be employed such as, without limitation, Windows, MAC OS, and LINUX. In some aspects, the software can optionally be implemented as a C language computer program, or a computer program written in any high level language including, without limitation, Javascript, Java, CSS, Python, PUP, Ruby, C++, C, Shell, C#, Objective-C, Go, R, TeX, VimL, Perl, Scala, CoffeeScript, Emacs Lisp, Swift, Fortran, or Visual BASIC. Certain script-based programs may be employed such as XML, WML, PUP, and so on. Additionally, general techniques for high level programming are known, and set forth in, for example, Stephen G. Kochan, Programming in C, Hayden Publishing (1983). The system 500 may use a DSP for which programming principles well known in the art.

As stated previously, the mass storage 508 may include a database. The database may be any suitable database system, including the commercially available Microsoft Access database, and can be a local or distributed database system. The design and development of suitable database systems are described in McGovern et al., A Guide To Sybase and SQL Server, Addison-Wesley (1993). The database can be supported by any suitable persistent data memory, such as a hard disk drive, RAID system, tape drive system, floppy diskette, or any other suitable system. The system 500 may include a database that is integrated with the system 500, however, it will be understood by those of ordinary skill in the art that in other embodiments the database and mass storage 508 can be an external element and/or implemented in a separate module.

In certain embodiments, the computer system 500 may include an Internet browser program and/or be configured operate as a web server. In some embodiments, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), for example. However, new protocols and revisions of existing protocols may be frequently introduced. Thus, in order to support a new or revised protocol, a new revision of the server and/or client application may be continuously developed and released.

In some implementations, module 106 may include a reconfigurable battery rack, framing, and/or positioning system to position one or more of batteries 414, 416, 418, and 420 within module 106.

Figure 6:
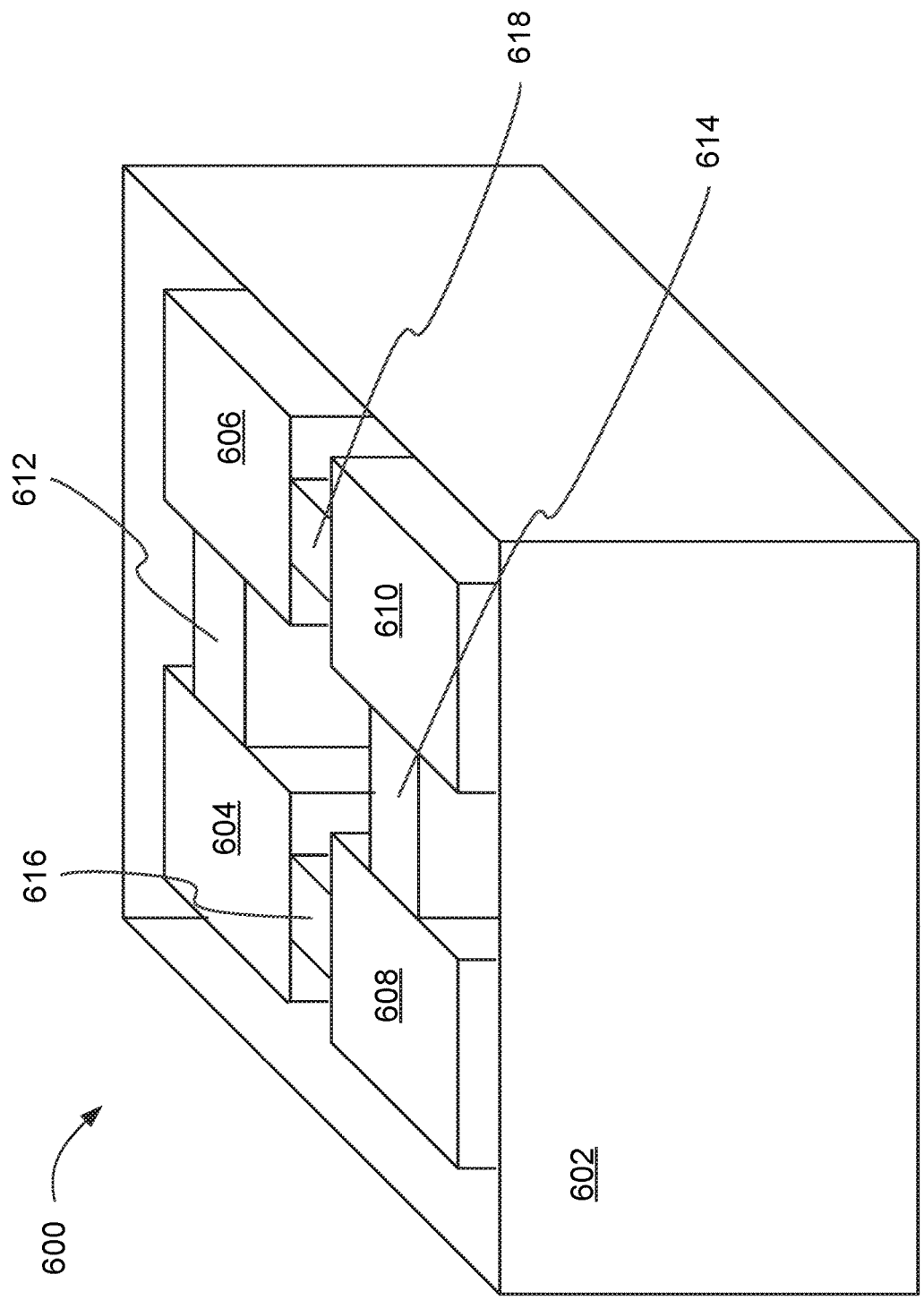

FIG. 6 shows a perspective view 600 of a module 106 holding four batteries 604, 606, 608, and 610 within its housing. In this instance each battery 106 is mounted vertically within module 106 (i.e., where the longest dimension of the battery extends from the bottom to the top of module housing 602). In one configuration, the batteries 604, 606, 608, and/or 610 are aligned and/or arranged within the housing using one or more alignment brackets and/or separators 612, 614, 616, and/or 618. The brackets may provide spacing between one or more batteries 604, 606, 608, and/or 610 to provide sufficient space for wires to extend to/from battery terminals. The space may also enable ventilation and/or heat dissipation within the module housing 602.

Figure 7:
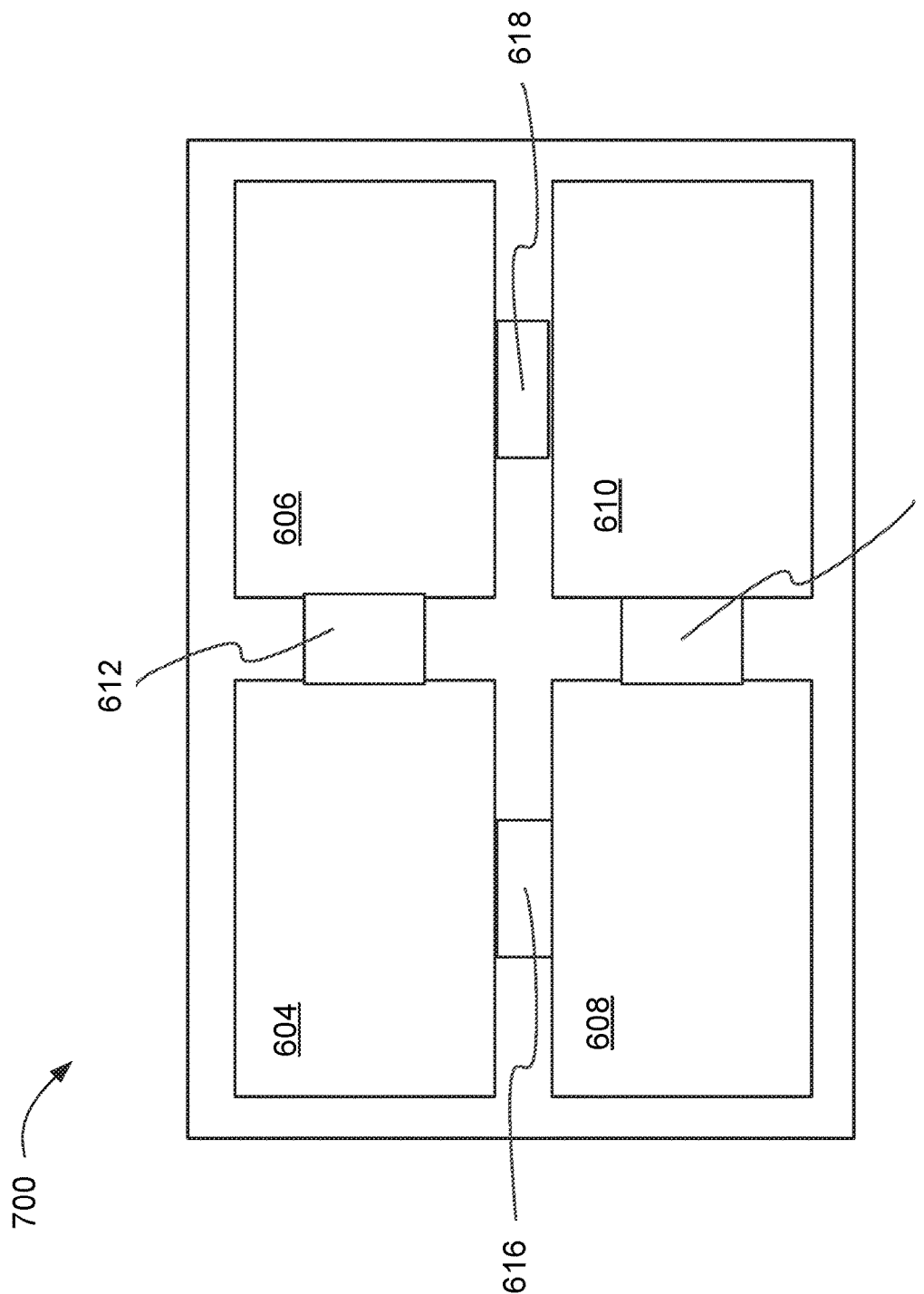
FIG. 7 shows a top down view of the battery housing including four batteries separated by brackets and/or spacers.

FIG. 7 shows a top down view 700 of the battery housing 602 including four batteries 604, 606, 608, and 610 being separated by brackets and/or spacers 612, 614, 616, and/or 618. The spacers 612, 614, 616, and/or 618 may formed and/or constructed to include plastic, metal, wood, ceramic, and/or a combination of the such materials. One or more spacers may extend vertically above one or more of the batteries in the housing 602. One or more spacers may extend vertically but below a top edge of one or more batteries to enable one or more wires to extend to/from terminals of one or more batteries.

Figure 8:
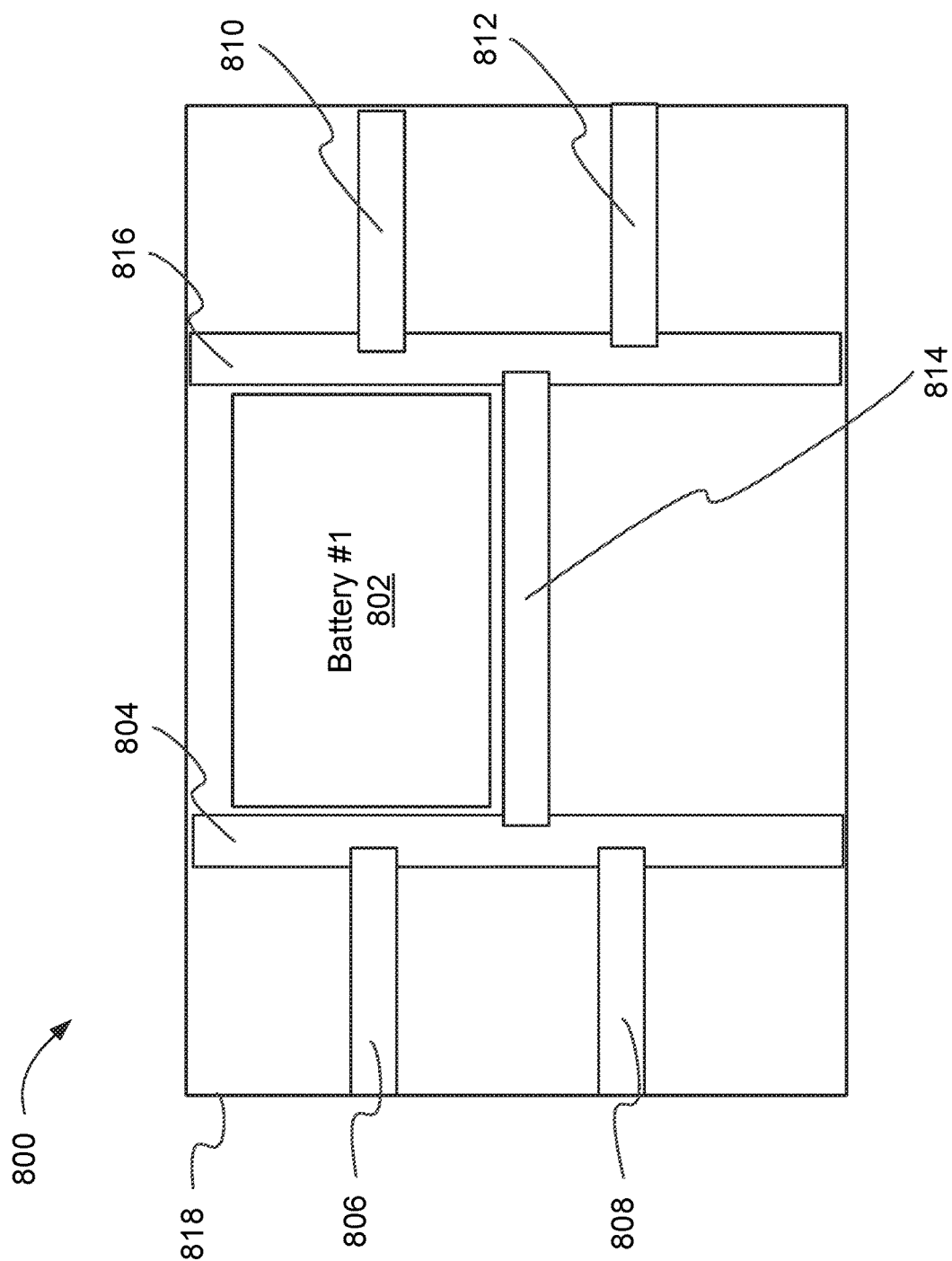
FIG. 8 shows a top down view of a battery housing including a single battery being positioned in the housing by reconfigurable battery rack assembly in a first configuration.

FIG. 8 shows a top down view 800 of battery housing 602 including a single battery 802 being positioned in the housing 602 by a reconfigurable battery rack assembly in a first configuration including components 804, 806, 808, 816, 810, and 812. The components 804-812 may include elongated boards 804 and 816 arranged to span the distance from the front to the back of housing 602. Elongated boards 806, 808, 810, and/or 812 may extend from a side of housing 602 to a side of elongate board 804 or 816. Each elongate board 804 and/or 816 may include one or more channels configured to receive an end of one or more of elongate boards 806, 808, 810, and/or 812. The height of boards 804-816 may be proportional to the height of one or more of the batteries 802, 902, 602, 604, 606, and/or 608. The height of the boards or beams 804-816 may be greater than or equal to ⅛, ¼, ⅓, ½, ¾, ⅞, 1, 1¼, 1⅓, or 1⅘ the height of an adjacent battery in a substantially vertical direction of the housing 602.

In some implementations, depending on the number of batteries within the housing 602, the components 804-816 are reconfigured to align and/or provide support for the batteries within the housing 602. In this way, the battery module 602, 206, and/or 106 and battery arrangement, positioning, and/or racking within system 400, 200, and/or 100 can be dynamically reconfigured as batteries are added or removed from the housing 602. In some implementations, one or more components of the battery rack and/or frame assembly may include one or more dadoes 1102-1116, channels, or trenches (See FIG. 11) to enable components 804-814 to be joined together substantially perpendicularly. For example, elongate board 804 may include two dadoes 1102 and 1104 where each dado 1102 and 1104 enable board 806 and 808 respectively to be connected to board 804. Elongate board 804 may also include another dado 1110 to enable board 814 to connect with board 804. Elongate Board 816 may also include one or more dadoes 1106 and 1108 channels, or trenches to enable joinder with boards 814, 810, and/or 812. The battery facing dadoes 1110, 1112, 1114, and/or 1116 of boards 804 and 816 may enable board 814 to extend adjacent to a surface of battery 802 or 902 to hold and position the one or more batteries in a location of the battery housing 818.

Figure 9:
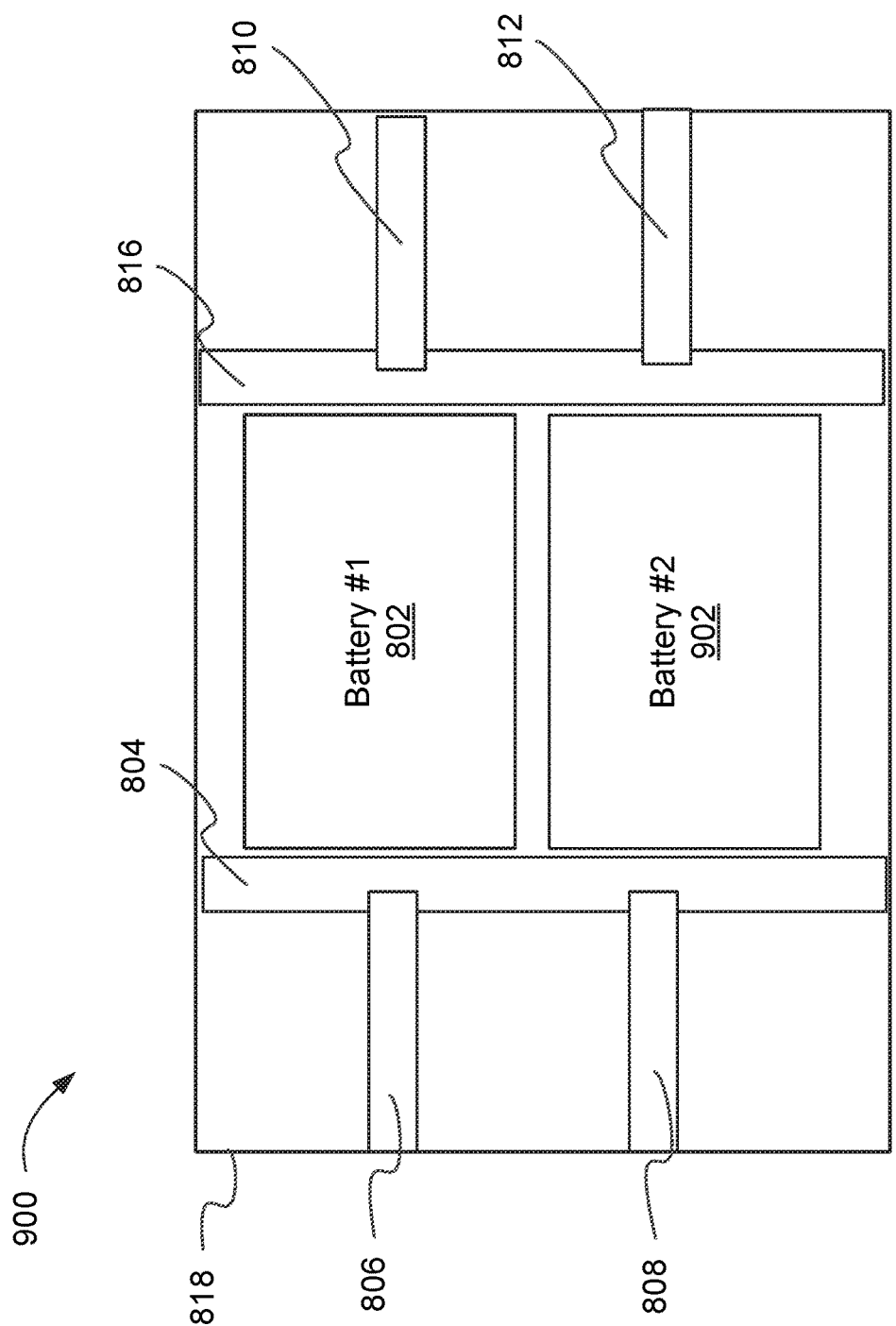
FIG. 9 shows a top down view of the battery housing of FIG. 8 including two batteries being positioned in the housing by the reconfigurable rack assembly in a second configuration.

FIG. 9 shows a top down view 900 of the battery housing 602 of FIG. 8 including two batteries 802 and 902 being positioned in the housing 602 by the reconfigurable rack and/or frame assembly including components 804-816 in a second configuration supporting two batteries. The elongate board 814 may be shifted horizontally and/or laterally toward the front of module 602 to support both batteries 802 and 902, or removed from the battery rack assembly depending on the amount of free space between boards 804 and 816 with batteries 802 and 902 present. Where the board 814 is shifted laterally (see FIG. 11), each board 804 and 816 may include second battery-facing dadoes 1114 and 1116 to enable joinder of board 814 to boards 804 and 816 at the laterally-shifted position (shown with dashed lines). In some implementations, a second elongate board 814 may be joined with boards 804 and 816 via dadoes 1114 and 1118 (in addition to first board 814 via dadoes 1110 and 1112) to enable the battery rack or frame assembly to hold a second battery.

FIG. 10A shows a top down view 1000 of the battery housing 602 of FIGS. 7, 8, and 9 including three batteries 1002, 1004, and 1006 being positioned in the housing 602 by a portion of the reconfigurable rack assembly including components 804-816 in a third configuration. Battery 1006 (i.e., battery #3) and rack or frame assembly support members 1008 (or 804), 1010 (or 1052), and 1012 (or 816) are positioned adjacent to the front 1014 of housing 818 and/or 602. Again, by implementing a flexibly reconfigurable rack and frame assembly system, the housing 818 and/or 602 is capable of supporting and/or aligning multiple battery configurations having various numbers of batteries. While the previous examples illustrate a system supporting up to four batteries, batteries storage including more than four batteries may be implemented depending on the size of each battery and the size of the housing 818 and/or 602. Boards 1008 and/or 1012 may include one or more dadoes to enable joinder with elongate board 1010. In some implementations, boards 1008, 1010, and 1012, may function as boards 806, 808, and/or 810. Hence, a battery rack and/or frame assembly supporting one or two batteries as illustrated in FIGS. 8 and 9 may be reconfigured using existing components to support three or more batteries as illustrated in FIG. 10A. While the previous exemplary figures illustrate the use of dadoes and/or trenches to facilitate joinder between boards, other fasteners and/or connectors may be implemented to provide joinder between components of the illustrated battery rack assembly.

Figure 10B:
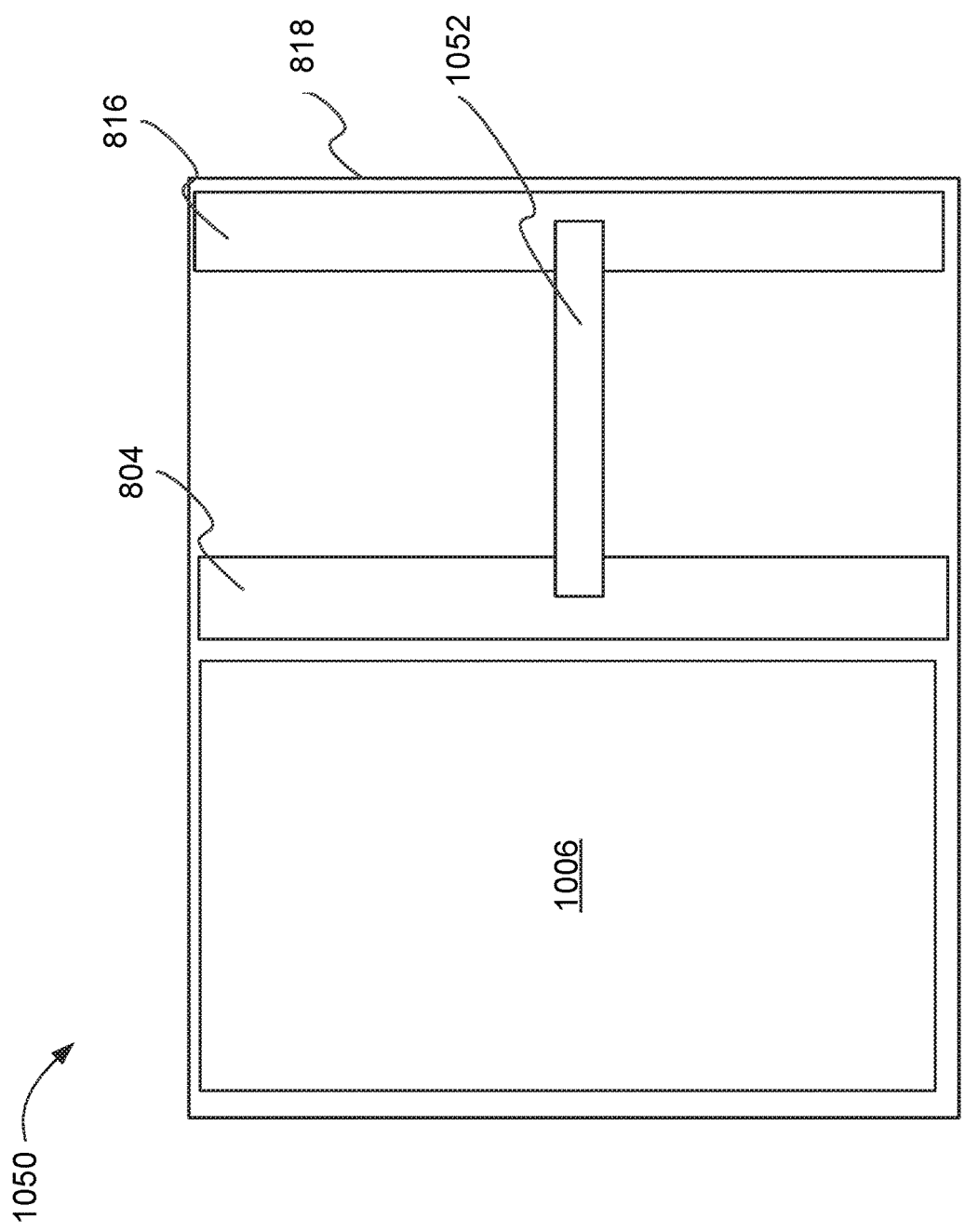
FIG. 10B shows a front perspective view of the third battery positioned adjacent to the reconfigured rack assembly in the housing of FIG. 10A.

FIG. 10B shows a front perspective view 1050 of the third battery 1006 positioned adjacent to the reconfigured rack and frame assembly including framing support members 804 and 816 in the housing 818 of FIG. 10A. For illustration purposes, view 1050 sees through the front wall of housing 818 to show the arrangement of battery 1006 with respect to framing support members 804, 816, and 1052. As previously illustrated in FIG. 8, support members 804 and 816 extended horizontally across the housing 818 and adjacent to battery 802 to provide lateral support for battery 802. But, in the configuration of FIG. 10B, support members 804 and 816 extend vertically from the bottom toward the top of housing 818. In this way, as long as support members 804 and 816 do not extend beyond the top of housing 818, support members 804 and 816 can be reused, along with support member 1052, to provide lateral support for the three batteries 1002, 1004, and 1006 in the configuration of FIGS. 10A and 10B. Essentially, the frame support structure including members 804, 816, and 1052 extends to the edges of a void where a fourth battery can be added to prevent excessive shifting and/or movement of batteries 1002, 1004, and 1006 in the three battery configuration.

In another aspect, system 100 and/or MPP 302 may be integrated with and/or electronically connected (including wirelessly) to a liquid powered generator such as generator 308. The system 100 may include a controller 118 arranged to monitor and/or control the operations of the generator 308. The controller 118 may be configured to monitor the power consumption and/or power output of the generator 308. The controller 104 may interface with memory 504 and one or more data sets or programs stored within, to coordinate operations of the generator 308 with the system 100. For example, the controller 118 may send control instructions to generator 308 to startup or shutdown the generator 308. In some implementations, the controller 118 interfaces with and/or includes a clock to determine time of day. The controller 118 may interface with a voltage, current, and/or power sensor to measure the power output of the generator 308 over a period of time.

The controller 118 may store data and/or power history information in a data store. The controller 118 may compare the output power of the generator 308 over a period of time with an output power capacity of the batteries and/or inverter(s) 406 of system 100. The controller 118 may identify one or more periods where the generator 308 can be shutdown, while sufficient power is provided via the batteries and/or inverter 406. In this way, less efficient gas consumption by the generator 308 is reduced by utilizing the stored energy of the batteries and the inverter 406 to provide power to a facility or home. For example, only a few systems may be needed late at night or early in the morning while people are sleeping. During that period of time, power may be transferred from the generator 308 to the batteries and inverter 406 of system 100 that can provide power to the facility or home, while conserving on gas used for the generator 308. But, when power demand increases, the controller 118 may send an instruction to the generator 308 to turn on to provide sufficient power for the increased load. The controller 118 may monitor the power output from inverter 406 and, if a threshold power limit is reached (e.g., 3000 watts), send an instruction to the generator 308 to startup and provide power. The MPP 100 may interface with and/or include an automatic transfer switch to automatically disconnect the AC output from inverter 406 and switch to the generator 308 output once the generator is running. Also, while the generator 308 is running, the generator 308 may provide power to the system 100 to charge the batteries in preparation for a subsequent transfer of power back to the batteries and inverter 406. The process may be continuously repeated during succeeding periods.

Figure 11:
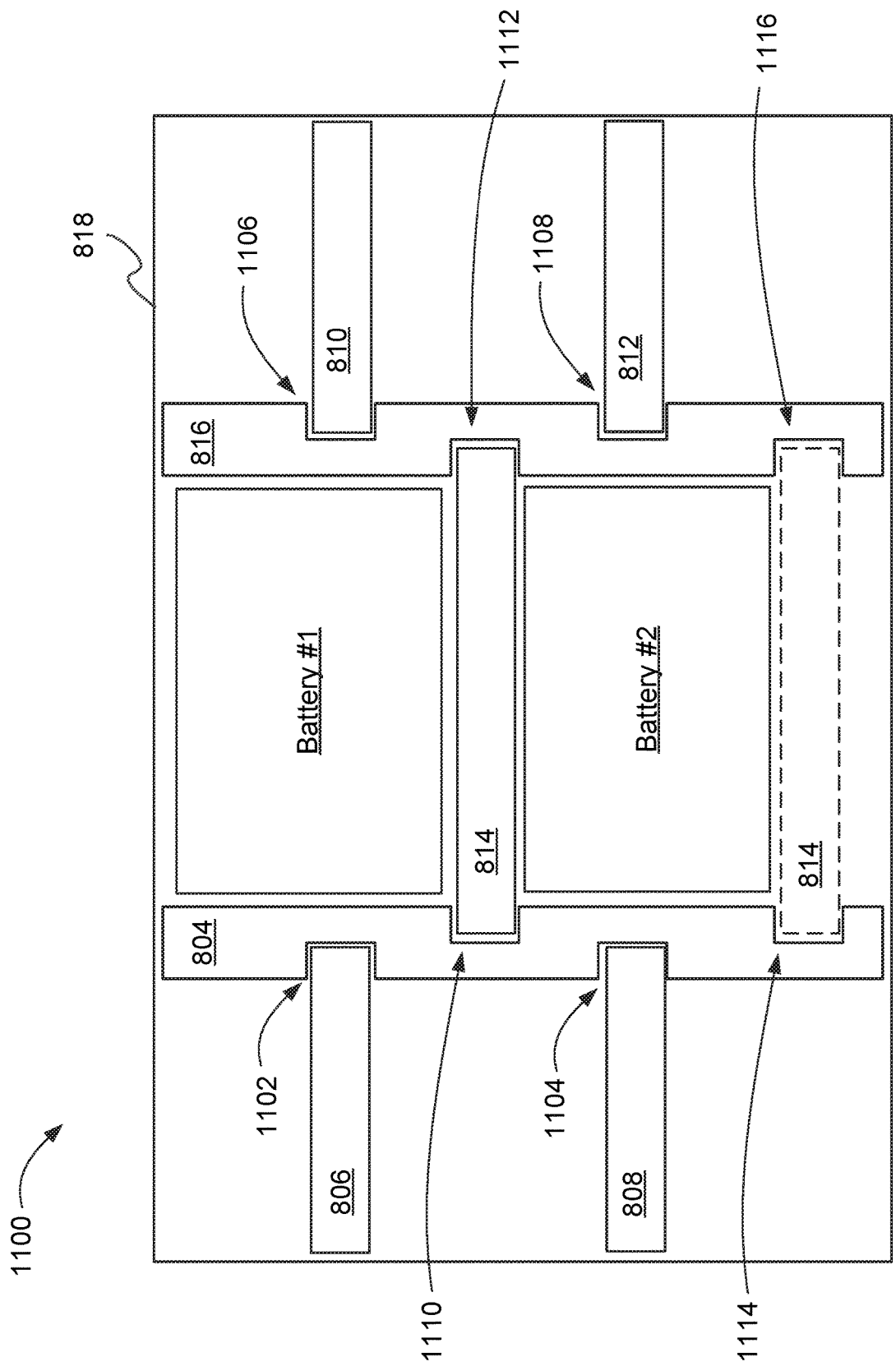
FIG. 11 shows a top down view of a battery rack assembly using components joined together via dadoes or trenches.

FIG. 11 shows a top down view 1100 of a battery rack and/or frame assembly using components 804-814 and/or 1118 being joined together via dadoes 1102-1116 or trenches. FIG. 11 shows boards 806 and 808 being positioned perpendicularly with respect to board 804 to provide bracing and/or lateral support of battery #1 and/or battery #2. Similarly, boards or frame support members 810 and 812 are positioned perpendicularly with respect to board or frame support member 816 to provide lateral support on a second side of battery #1 and/or battery #2. In some implementations, depending on the size and/or form-factor of the batteries, one or more of frame support members 806, 808, 810, and 812 may be aligned in parallel with support members 804 and 816 respectively, depending on the available space between battery #1 and/or battery #2 and a side wall of battery housing 818.

Figure 12:
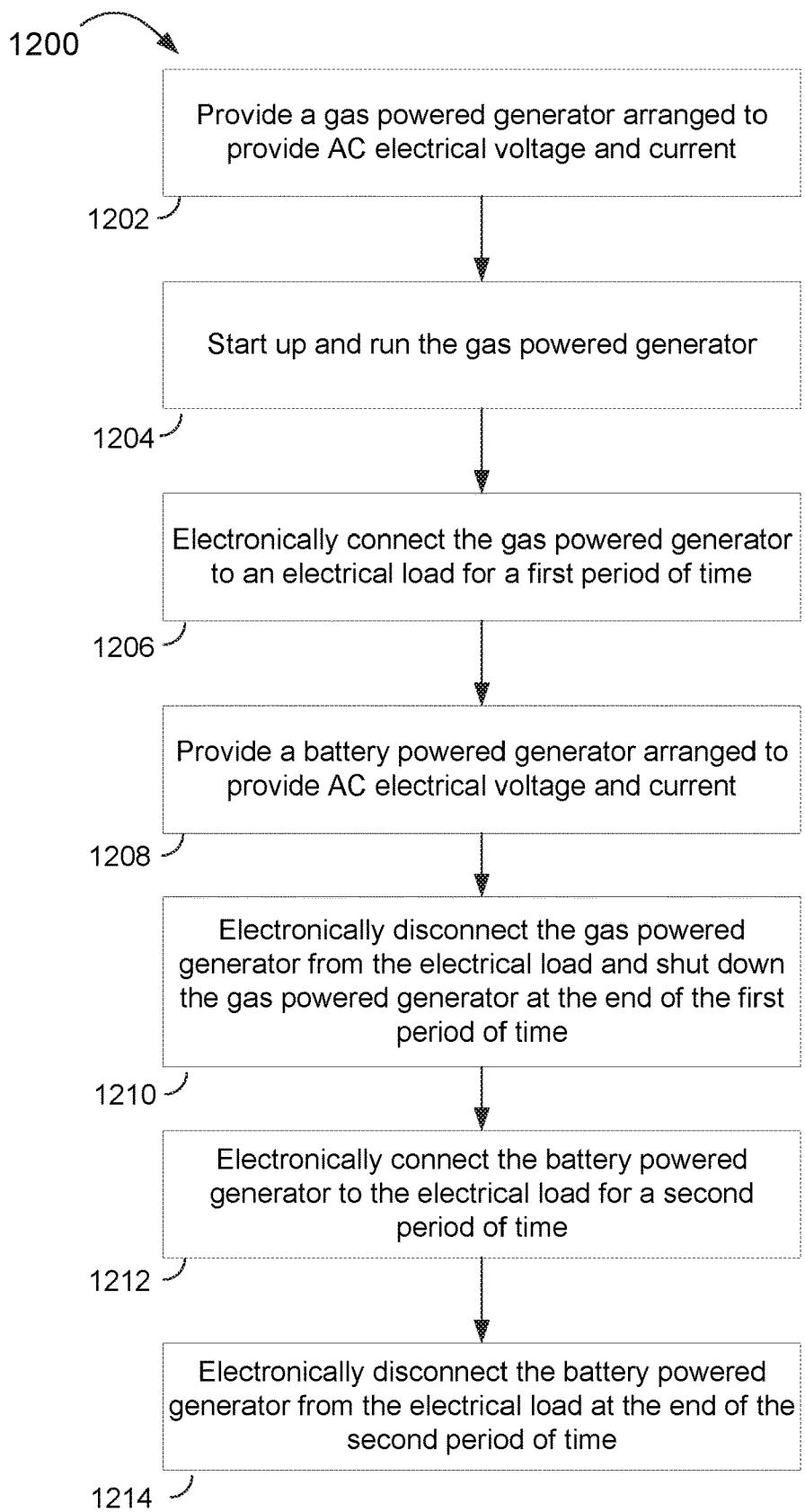
FIG. 12 is a block diagram of a process for providing emergency backup power using a gas powered generator and a battery powered generator.

FIG. 12 is a block diagram of a process 1200 for providing emergency backup power using a gas powered generator and a battery powered generator. The process includes: providing a gas powered generator, e.g., generator 308, arranged to provide AC electrical voltage and current (Step 1202), starting up and running the gas powered generator 308 (Step 1204), electronically connecting the gas powered generator 308 to an electrical load, e.g., refrigerator 316, light 320 and stove 318, for a first period of time (Step 1206), providing a battery powered generator, e.g., modular portable power plant 302, arranged to provide AC electrical voltage and current (Step 1208), electronically disconnecting the gas powered generator from the electrical load and shutting down the gas powered generator 308 at the end of the first period of time (Step 1210), electronically connecting the battery powered generator 302 to the electrical load for a second period of time (Step 1212), and electronically disconnecting the battery powered generator 302 from the electrical load at the end of the second period of time (Step 1214). As discussed above, a controller 118 of MPP 100 may control start up and shutdown of generator 308.

Steps 1202 through 1214 may be repeatedly performed over an extended period of time. The process 1200 may include electronically connecting the battery powered generator 302 to the gas powered generator 308 during a portion of the first time period and charging at least one battery of the battery powered generator 302 from the gas powered generator 308. The battery powered generator 302 may include a DC/AC inverter arranged to generate an output AC voltage and current and an AC/DC converter arranged to generate DC voltage and current to charge at least one battery of the battery powered generator 302.

The gas powered generator 308 may be arranged to use at least one of gasoline, diesel, liquid propane gas (LPG), and natural gas. The gas powered generator 308 may be a tri-fuel generator capable of running on gasoline, propane, and natural gas. In one implementations, the power output of the gas powered generator 308 is greater than the power output the battery powered generator 302. The first period of time may correspond to a period of peak power usage and the second period of time may correspond to a period of off-peak or lessor power usage. For example, as previously discussed, to reduce wear on and gas consumption by the gas powered generator 308, the gas powered generator 308 may be run and provide electrical power to a home during the day or early evening when people need more power. But, at night or in the early morning (i.e., off peak hours), a limited amount of power may be needed for, for example, a stove 318 and refrigerator 316. Thus, the battery powered generator 302 may be connected to power these loads during off peak hours, while the generator 308 is shut down to prolong its life and reduce gas consumption. In this way, backup emergency power can be provided in an emergency situation for longer or extended periods of time without the need to refuel the gas powered generator as often while also improving the overall reliability of the backup system. A controller of the battery powered generator, e.g., a controller 118 of module 104, may monitor the power output of the gas powered generator during a first interval and, in response, determine the first and second time periods. The first interval may include 1, without limitation, 12 hrs, 1 day, 1 week, 2 weeks, or 1 month.

The electrical load may include, without limitation, a private building, public building, commercial building, hospital, government facility, public facility, private facility, vehicle, individual equipment requiring electrical power, or any system or device requiring electrical power. The process 1200 may further include controlling, by the batter powered generator 302, at least one disconnect switch to perform: disconnecting the gas powered generator 308 from an electrical load; disconnecting the battery powered generator 302 from the gas powered generator 308; disconnecting the battery powered generator 302 from the electrical load; connecting the gas powered generator 308 to the electrical load; connecting the battery powered generator 302 to the gas powered generator 308; connecting the battery powered generator 302 to the electrical load; disconnecting utility power from the electrical load; or connecting utility power to the electrical load. Alternatively, one or more of the connection and disconnection functions may be performed manually by an operator.

The gas powered generator 308 and battery powered generator 302 may be separate devices where the battery powered generator 302 is a modular and portable power device. The gas powered generator 308 and battery powered generator 302 may be integrated in single device. The process 1200 may further include disconnecting utility power from the electrical load before performing Steps 1202 through 1214 and connecting utility power to the electrical load after performing Steps 1202 through 1214. The connection and disconnection of utility power may be performed before and/or after Steps 1202 through 1214 have be repeatedly performed over an extended period of time. For example, utility power may be lost to a home due to a hurricane for a week. Utility power may be initially disconnected when power is lost (even when there is no power on the utility line to prevent feedback of power from the home to the utility line). Over the week period, Steps 1202-1214 may be repeatedly performed on a daily basis where the gas powered generator is run for an 8 hour period and the battery powered generator is run for remaining 16 hour period each day. At the end of the week when utility power is restored, power from the gas powered generator 308 and/or battery powered generator 302 is disconnected and then utility power is re-connected to the home.

It will be apparent to those of ordinary skill in the art that certain aspects involved in the operation of the MPP may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

What is claimed is:

1. A modular portable power system comprising:
    a first module configured to house a first bank of one or more batteries arranged in one of a first configuration and a second configuration, the first module including a reconfigurable battery rack assembly arranged to be configured to provide support for a first battery set in the first configuration and a second battery set in the second configuration, wherein the number of batteries in the first battery set is different than the number of batteries in the second battery set; and
    a second module, being detachably connectable to the first module, the second module including:
    a first DC to AC power inverter, capable of being in electrical communications with the first bank of one or more batteries, configured to output power up to a first power limit and provide an AC sine wave of a first type.

2. The system of claim 1, wherein the first and second modules are portable.

3. The system of claim 1, wherein at least one of the first and second modules includes at least one mobility mechanism.

4. The system of claim 3, wherein the at least one mobility mechanism includes wheels arranged to enable the system to be moved from a first location to a second location while the first and second modules are detachably connected to each other.

5. The system of claim 4, wherein at least one of the first and second modules includes a holding mechanism arranged to enable the first and second modules to be concurrently moved by a user while the first and second modules are detachably connected.

6. The system of claim 5, wherein the holding mechanism includes a handle arranged to enable the user to perform at least one of tilt, move, push, and pull the system.

7. The system of claim 1, wherein the first DC to AC power inverter is in electrical communications with the first bank of one or more batteries via a switch array.

8. The system of claim 7, wherein the switch array includes one or more switches, the one or more switches being configurable to disconnect one or more batteries of the first bank from electrical communications with the first DC to AC power inverter.

9. The system of claim 7, wherein the switch array is configured to connect any two batteries of the first bank in series or parallel.

10. The system of claim 1 comprising a controller arranged to monitor one or more parameters of the first bank and, in response, set the position of one or more switches of a switch array.

11. The system of claim 1 comprising at least one selected from the group of a vehicle battery charging interface, a solar charging system interface, a generator, and AC outlet charging interface.

12. The system of claim 1, wherein the reconfigurable battery rack assembly includes at least one frame support member being in a first position in the first configuration and in a second position in the second configuration, the first position being different than the second position.

13. A method for providing modular portable electrical power comprising:
   providing a first module including a first bank of one or more batteries;
   configuring the first module to house a first bank of one or more batteries arranged in one of a first configuration and then configuring the first module to house the first bank in a second configuration, the first module including a reconfigurable battery rack assembly arranged to be reconfigured to provide support for a first battery set in the first configuration and a second battery set in the second configuration, wherein the number of batteries in the first battery set is different than the number of batteries in the second battery set; and
   providing a second module including a first DC to AC power inverter configured to provide output power up to a first power limit and provide an AC sine wave of a first type;
   mechanically connecting the first module to the second module; and
   electrically connecting the first bank of one or more batteries to the first DC to AC power inverter.

14. A method for providing emergency backup power comprising:
   a) providing a gas powered generator arranged to provide AC electrical voltage and current;
   b) starting up and running the gas powered generator;
   c) electronically connecting the gas powered generator to an electrical load for a first period of time;
   d) providing a battery powered generator arranged to provide AC electrical voltage and current;
   e) electronically disconnecting the gas powered generator from the electrical load and shutting down the gas powered generator at the end of the first period of time;
   f) electronically connecting the battery powered generator to the electrical load for a second period of time;
   g) electronically disconnecting the battery powered generator from the electrical load at the end of the second period of time; and
   h) monitoring, by a controller of the battery powered generator, the power output of the gas powered generator during a first interval and, in response, determining the first and second time periods.

15. The method of claim 14, comprising repeatedly performing steps A through G over an extended period of time.

16. The method of claim 14 comprising:
   electronically connecting the battery powered generator to the gas powered generator during a portion of the first time period; and
   charging at least one battery of the battery powered generator from the gas powered generator.

17. The method of claim 14, wherein the power output of the gas powered generator is greater than the power output the battery powered generator.

18. The method of claim 14 comprising;
   controlling, by the batter powered generator, at least one disconnect switch to perform at least one of:
   disconnecting the gas powered generator from the electrical load;
   disconnecting the battery powered generator from the gas powered generator;
   disconnecting the battery powered generator from the electrical load;
   connecting the gas powered generator to the electrical load;
   connecting the battery powered generator to the gas powered generator;
   connecting the battery powered generator to the electrical load;
   disconnecting utility power from the electrical load; and
   connecting utility power to the electrical load.

19. The method of claim 14 comprising:
   disconnecting utility power from the electrical load before performing Step A through G; and
   connecting utility power to the electrical load after performing Steps A through G.

* * * * *